United States Patent [19]
Shibata et al.

[11] Patent Number: 5,706,403
[45] Date of Patent: Jan. 6, 1998

[54] SEMICONDUCTOR NEURAL CIRCUIT DEVICE

[76] Inventors: Tadashi Shibata, 5-2, Nihondaira; Tadahiro Ohmi, 1-17-301, Komegabukuro 2-chome, both of Aoba-ku, Sendai-shi, Miyagi-ken 980, Japan

[21] Appl. No.: 424,267
[22] PCT Filed: Oct. 29, 1993
[86] PCT No.: PCT/JP93/01573
 § 371 Date: Apr. 24, 1995
 § 102(e) Date: Apr. 24, 1995
[87] PCT Pub. No.: WO94/10648
 PCT Pub. Date: May 11, 1994

[30] Foreign Application Priority Data
Oct. 29, 1992 [JP] Japan .................. 4-314139
[51] Int. Cl.$^6$ .................. G06F 15/18; G06G 7/60
[52] U.S. Cl. .................. 395/23; 395/24
[58] Field of Search .................. 395/23, 24, 27

[56] References Cited
U.S. PATENT DOCUMENTS

| | | | |
|---|---|---|---|
| 5,052,043 | 9/1991 | Gaborski | 395/23 |
| 5,129,038 | 7/1992 | Kohda et al. | 395/23 |
| 5,239,618 | 8/1993 | Yamaguchi et al. | 395/23 |
| 5,258,657 | 11/1993 | Shibata et al. | 395/24 |
| 5,347,613 | 9/1994 | Chung et al. | 395/23 |
| 5,465,308 | 11/1995 | Hutcheson et al. | 395/23 |
| 5,475,794 | 12/1995 | Mashiko | 395/24 |

FOREIGN PATENT DOCUMENTS 4-30280  2/1992  Japan .................. G06F 15/18

*Primary Examiner*—Robert W. Downs
*Attorney, Agent, or Firm*—Marshall, O'Toole, Gerstein, Murray & Borun

[57] ABSTRACT

A semiconductor neural circuit device having a very simple circuit and a self-teaching function, by which a neural network is allowed to learn. The device comprises synapse circuits which output weighted values, and neuron circuits which execute linear addition of the output signals from the synapse circuits, and output the signal voltages of high and low levels with respect to a given threshold value $V_{TH}$. In the case of learning of increasing the total value Z, only when $V_{TH}-\epsilon < Z < V_{TH}+\alpha$ with respect to two positive parameters $\epsilon$ and $\alpha$, the weighted value of predetermined synapse circuits which input signals to the neuron circuit is increased by a given positive value. Conversely, in the case of learning of the decreasing the total value Z, only when the $V_{TH}-\alpha < Z < V_{TH}+\epsilon$, the weighted value of predetermined synapse circuit which input signals to the neuron circuit is decreased by a given positive value.

6 Claims, 35 Drawing Sheets

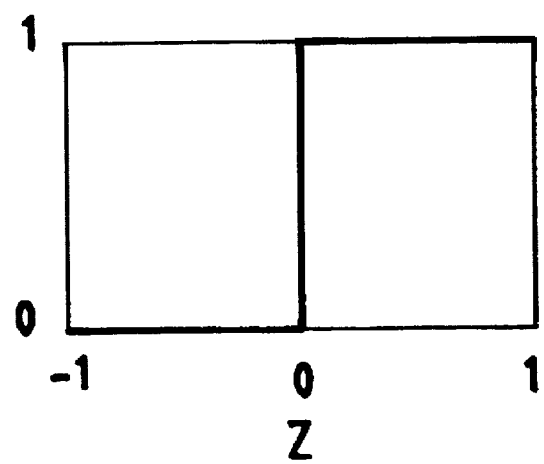
FIG. 2A  f(z)
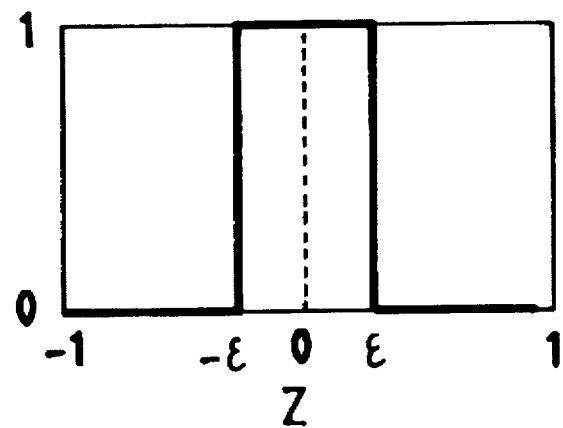
FIG. 2B  f'(z)
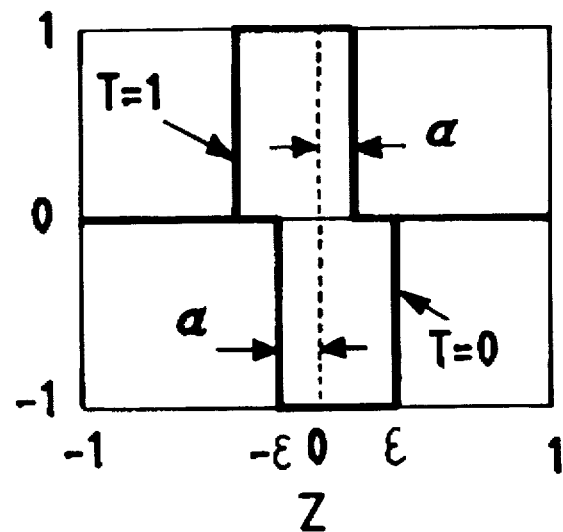
FIG. 2C  δ

$$Z = \sum_{i=i}^{n} w_i V_i$$

SEMICONDUCTOR NEURAL CIRCUIT DEVICE

TECHNICAL FIELD

The present invention relates to a semiconductor neural device, and in particular, provides a semiconductor integrated circuit neural network possessing a self-teaching function.

BACKGROUND ART

Neural networks are the electronic circuits which model the nerve circuit nets of the brain; such neural networks show great promise in next-generation information processing. In order to create high-level information processing closer to that of human beings, attempts have been made to realize neural networks on ultra LSI chips.

However, there are still a variety of problems in realizing neuron computers on LSI chips using current semiconductor LSI technology, and the current state of affairs is such that the goal of application has essentially not been achieved.

The technological problems involved in realizing such computers in LSI chips are stated below.

Human brains have extremely complicated structures and an extremely high degree of function; however, the basic composition thereof is extremely simple. That is to say, the brain is comprised of nerve cells having a calculating function, termed neurons, and nerve fibers, which serve to transmit the results of such calculations to other neurons, that is to say, which serve as wiring.

A simplified model of the structure of the fundamental unit of the brain is shown in FIG. 29. References 901a, 901b, and 901c indicate neurons, while references 902a, 902b and 902c indicate nerve fibers. References 903a, 903b and 903c are termed synapse junctions; for example, such a junction applies a weight wa to the signal sent along nerve fiber 902a, and inputs this into neuron 901a. Neuron 901a determines the linear sum of the signal strengths inputted thereinto, and if the total value thereof exceeds a threshold value, the neuron becomes active, and outputs a signal to nerve fiber 902b. If the total value is less than or equal to the threshold value, the neuron does not output a signal. When the total value reaches or exceeds the threshold value, and the neuron outputs a signal, this neuron is said to "fire".

In an actual brain, these calculations, transmission of signals, application of weighting, and the like are all conducted by means of electrochemical phenomena, and the signals are transmitted and processed as electrical signals. The process of learning in human beings can be understood as the process of altering the weighting in the synapse junctions. That is to say, with respect to a variety of combinations of inputted signals, the weighting is slowly corrected so as to obtain a correct output, and the system finally settles at the optimal values. That is to say, human intellect is engraved in the brain as synapse weighting.

A large number of neurons are connected to one another via synapses to form one layer. It is known that six layers exist, one on top of the other, in the human brain. The realization of this structure and function as an LSI system using semiconductor devices is the most important problem in the realization of a neuron computer.

FIG. 30 (a) serves to explain the function of one nerve cell, that is to say, one neuron; this was proposed as a mathematical model by McCullock and Pitts in 1943 (Bull: Math. Biophys. Vol. 5, p. 115 (1943)). Research into the realization of this model using semiconductor circuits and into the construction of a neuron computer is being widely conducted even now. References $V_1, V_2, V_3 \ldots V_n$ indicate a number n of input signals which are defined, for example, as voltage sizes; these correspond to the signals which are transmitted to other neurons. References $w_1, w_2, w_3, \ldots, w_n$ are coefficients expressing the strength of junctions between neurons; these are termed the synapse junctions in biology. The function of the neuron is to output a value of "1" when a value Z resulting from the linear addition of all inputs $V_i$ with the weights $w_i$ (i=1–n) applied thereto exceeds a predetermined threshold value $V_{TH}*$, and to output a value of "0" when the value Z is less than this threshold value. This can be expressed in a formula as follows:

$$Z = \sum_{i=1}^{n} W_i V_i \quad (1)$$

$$V_{out} = 1 \ (Z > V_{TH}*) \quad (2)$$
$$0 \ (Z < V_{TH}*) \quad (3)$$

FIG. 30(b) shows the relationship between Z and $V_{out}$; when Z is sufficiently larger than $V_{TH}*$, then a value of 1 is outputted, when Z is sufficiently smaller, a value of 0 is outputted.

If an attempt is made to realize such a neuron using a combination of transistors, it is not merely the case that a large number of transistors will be necessary; the addition calculation is conducted by converting each signal into an electrical current value and mutually supplying them, so that a large current is caused to flow, and an excessive amount of power is consumed. In such a situation, large scale integration is impossible. This problem was solved by the neuron MOSFET (abbreviated vMOS)(inventors: Tadashi Shibata and Tadahiro Ohmi, Japanese Patent Application No. Hei 1-141463).

This invention was epoch-making in that it succeeded in achieving the main functions for neuron operation on a single transistor, and moreover, the voltage signals could be added in an unchanged manner, so that almost no power was consumed. FIG. 31 shows a simplified example of the vMOS cross sectional structure; reference 1101 indicates, for example, a P type silicon substrate, references 1102 and 1103 indicate a source and a drain formed by $N^+$ diffusion layers, reference 1104 indicates a gate insulating film ( for example, $SiO_2$ or the like) provided on the channel region, reference 1106 indicates a floating gate which is electrically insulated and is in a potentially floating state, reference 1107 indicates an insulating film comprising, for example, $SiO_2$ or the like, and reference 1108 ($G_1, G_2, G_3, G_4$) indicates input gates which correspond to the neuron inputs.

FIG. 32 shows a further simplification thereof so as to explain the operation thereof. If the capacitive coupling coefficient between each gate electrode and the floating gate is represented by $C_G$, and the capacitive coupling coefficient between the floating gate and the silicon substrate is represented by $C_O$, then the potential Z of the floating gate is expressed by the following formulas:

$$Z = W(V_1 + V_2 + V_3 + V_4) \quad (4)$$

$$W = C_G/(C_O + 4C_G) \quad (5)$$

Here, references $V_1, V_2, V_3,$ and $V_4$ indicate the voltages which are inputted into, respectively, input gates $G_1, G_2, G_3,$ and $G_4$, and the potential of the silicon substrate is 0V; that is to say, it is grounded.

If the floating gate is viewed as a gate electrode, this vMOS is a standard N channel MOS transistor, and if the threshold voltage as viewed from the floating gate (the voltage at which an inversion layer forms on the substrate surface) is represented by $V_{TH}^*$, then when $Z>V_{TH}^*$ the vMOS described above enters an ON state, while when $Z<V_{TH}^*$, the vMOS is in an OFF state. That is to say, if an inverter circuit such as that shown, for example, in FIG. 33 is combined with this vMOS 1109, it is possible to realize the functions of a single neuron in a simple manner. References 1110 and 1111 indicate resistances for constructing the inverter, while reference 1112 indicates a NMOS transistor. FIG. 34 shows $V_{out1}$ and $V_{out2}$ as a function of Z; in response to an input of $Z>V_{TH}^*$, $V_{out2}$ outputs the high level voltage of $V_{DD}$. That is to say, the state of neuron firing is realized.

The basic operation, in which the inputs into a neuron are added as voltage levels, and the neuron fires when the linear sum thereof equals or exceeds a threshold value, as shown in Formula (4), is realized by means of a single vMOS. Since voltage mode addition is conducted, the only current flowing in the input portion is the charge and discharge current of the capacitors, and the size thereof is very small. On the other hand, in the inverter, a direct current flows during neuron firings; however, this is because resistance 1110 is used as the load, and if a vMOS gate having a CMOS structure in accordance with the invention described above (Japanese Patent Application, No. Hei 1-141463) is used, it is possible to eliminate this direct current.

FIGS. 35 and 36 show examples of CMOS structures. FIG. 35 shows the cross sectional structure of a CMOS neuron gate; reference 1201 indicates a P type silicon substrate, reference 1202 indicates an n-type well, references 1203a and 1203b indicate, respectively, a $N^+$type source and drain, references 1204a and 1204b indicate, respectively, a $P^+$type source and drain, reference 1205 indicates a floating gate, and references 1206a–d indicate respective input gate electrodes. References 1207 and 1208 indicate insulating films comprising, for example, $SiO_2$ or the like, and reference 1209 indicates a field oxide film. FIG. 36 shows an example of the composition of a neuron circuit; reference 1210 indicates the CMOS neuron gate of FIG. 35, and other references correspond to those used in FIG. 35. Reference 1211 indicates a CMOS inverter; references 1212 and 1213 indicate, respectively, NMOS and PMOS transistors. Furthermore, reference 1214 indicates the output of the neuron.

As described above, it is possible to construct a neuron using a small number of elements, and moreover, the power consumption is extremely small, so that the vMOS is an indispensable element for realizing a neuron computer.

However, in order to realize a neuron computer, it is necessary to construct another important element in addition to the neuron; that is to say, the synapse. The circuit shown in FIGS. 35 and 36 is a newly invented synapse circuit (Japanese Patent Application, No. Hei 4-170292); this circuit is epoch-making in that there is no standby time and no power consumption, and both positive and negative weighting can be expressed using a single 5V power source. Furthermore, it possesses the advantageous feature of being applicable to self-teaching functions.

Next, the operation of the circuit shown in FIG. 22, will be explained. First, when the pre-stage neuron does not fire, that is to say, when $V_i=0$ ($V_i^*=V_{DD}$), then NMOS 104' and PMOS 105 are in an OFF state, and NMOS 104 and PMOS 105' are in an ON state and the circuit becomes equivalent to that in FIG. 23. Since output terminals 108 and 108' are, respectively, directly connected to earth (0V) and $V_{DD}$, they have values of, respectively, 0 and $V_{DD}$. On the other hand, when the pre-stage neuron fires, NMOS 104' and PMOS 105 are in an ON state, while NMOS 104 and PMOS 105' are in an OFF state, and the circuit becomes equivalent to that in FIG. 24. At this time, the potential of the $V^+$ terminal rises, since a current flows thereinto from power source $V_{DD}$ via NMOS transistor 102, and this increase continues until the NMOS transistor enters an OFF state. Accordingly, the final value thereof is $\phi_F^S - V_{TH}^*$. Here, $V_{TH}^*$ indicates the threshold voltage as seen from the NMOS floating gate. Furthermore, the potential of the $V^-$ terminal declines with time, since the charge is discharged via PMOS 103, and the final value thereof is $\phi_F^S - V_{TP}^*$. Here, $V_{TP}^*$ indicates the threshold value as seen from the PMOS floating gate.

The state of the change in the relaxation of $V^+$ and $V^-$ after the pre-stage neuron has fired when $t=t_1$ is shown in FIG. 25.

$V^+$ and $V^-$ are coupled with the floating gate 110 of the following-stage neuron via capacitors $C_1$ and $C_2$, so that this has the same effect as if a potential $V_{EFF}$ were applied via a single capacitor $C_1+C_2$ (see FIG. 26).

This $V_{EFF}$ is expressed by the following formula:

$$V_{EFF}=(C_1V^+ + C_2V^-)/(C_1+C_2) \tag{7}$$

In this case, since setting is conducted so that $C_1=C_2=C/2$, then the following holds:

$$V_{EFF}=(V^+ + V^-)/2 \tag{8}$$

and this is the same as if this potential were coupled to floating gate 110 via a capacitor of size C.

The change over time in $V_{EFF}$ is shown in FIG. 25. Summarizing the above, when the pre-stage neuron does not fire ($V_i=0$), the circuit shown in FIG. 22 outputs $$V_{EFF}=V_{DD}/2$$

and when this neuron fires (when $V_i=V_{DD}$), then the synapse circuit outputs:

$$V_{EFF}=\{2\phi_F^S-(V_{Tn}^*+V_{Tp}^*)\}/2$$

In particular, when $V_{Tn}^*=|V_{Tp}^*|(V_{Tp}^*<0)$, the synapse circuit outputs $$V_{EFF}+\phi_F^S.$$

FIG. 27 shows the state in which a neuron 109 is coupled with the outputs $V_1, V_2, \ldots V_n$ of a number of neurons n via identical synapse circuits $S_1, S_2, \ldots S_n$. At this time, the following formula can be applied to the floating gate potential $\phi_F$ of neuron 109.

[2]

$$\phi_F = \sum_{i=1}^{n}(C/C_{TOT})[\phi_F^S(V_i/V_{DD})+(V_{DD}/2)\{1-(V_i/V_{DD})\}] \tag{9}$$

$$= \sum_{i=1}^{n}(C/C_{TOT})\{\phi_F^S-(V_{DD}/2)\}(V_i/V_{DD})+(nC/C_{TOT})(V_{DD}/2)$$

When $C_{TOT}$+nC, then the following results:

[3]

$$\phi_F = \sum_{i=1}^{n}(1/n)(\phi_F^S/V_{DD}-1/2)V_i + V_{DD}/2 \tag{10}$$

Accordingly, the weighting of each synapse can be effectively expressed by the following:

$$W_i=(1/n)(\phi_F^S/V_{DD}-1/2) \tag{11}$$

If $\phi_F^S/V_{DD}>(1/2)$, then $W_i>0$, and an excited synapse junction results, while if $\phi_F^S/V_{DD}<(1/2)$, then $W_i<0$, and a suppressed synapse results. $\phi_F^S$ is represented by Formula (6), so that if for example $V_x=V_y=V_E=0$, then the following results:

$$\phi_F{}^S = Q/C_{TOT} \quad (12)$$

$$(C_{TOT} = C_x + C_y + C_E + C_O)$$

and by means of the value of $Q_F$, it is possible to set the value of $\phi_F{}^S$, that is to say, the value of $W_i$ to a freely determined positive or negative value.

For example, if setting is conducted so that $V_x = V_E = V_{DD}$, and $V_y = 0$, and $C_x + C_E + (1/2)C_{TOT}$, then from Formulas (6) and (11), $W_i$ is expressed by the following formula:

$$W_i = (1/n)(Q_F/C_{TOT} V_{dd}) \quad (13)$$

and the positive or negative character of $W_i$ is determined by the positive or negative value of $Q_F$. That is to say, in the present synapse circuit, an overvoltage value of either positive or negative polarity can be established solely by means of one power source voltage $V_{DD}$. Furthermore, as is clear from FIGS. 23 and 24, independent of the firing or non-firing of the pre-stage neuron, one or the other of the transistors is in an OFF state, so that the so-called through-type current does not flow in a constant manner. Accordingly, the power consumption is low, and this is ideal for large scale integration.

Next, the method of changing the value of the charge $Q_F{}^S$ within the floating gate 101 will be discussed. If, for example in Formula 6, $C_x = C_y$, and for the purposes of simplicity, $C_E$, $C_O << C_x$, $C_y$, then $C_E = C_O = 0$, so that these can be ignored. Furthermore, if $Q_F = 0$ is assumed, then when $V_x = V_y = V_{pp}$, $\phi_F{}^S = V_{pp}$; however, when either of $V_x$ and $V_y$ has a value of 0V, $\phi_F{}^S = V_{pp}/2$. Furthermore, when $V_x = V_y = 0$, it is of course the case that $\phi_F{}^S = 0$. Accordingly, only in those synapses in which $V_x = V_y = V_{pp}$ and $V_E = 0$ is the program voltage $V_{pp}$ (for example, 10V) applied in tunnel oxide film portion 115, so that tunneling is produced, electrons are implanted in the floating gate and $\Delta Q_F < 0$. In other cells, tunneling does not occur. The reason for this is that Fowler—Nordheim tunnel currents decrease exponentially with respect to voltage (electric field), and do not flow at $(1/2) V_{pp}$. When electrons are discharged, electron discharge only occurs in synapses in which $V_x = V_y = 0$ and $V_E = V_{pp}$.

For example, it is possible to dispose $V_x$ and $V_y$ and the wiring sending these in the X direction and the Y direction, and to reduce the weighting only in those synapses positioned at the intersection of wires to which a potential $V_{pp}$ is applied, or to increase the weighting at only those synapses positioned at the intersection of wires to which 0V is applied. At this time, $V_E$ is common to the entirety of the chip (see FIG. 28).

For example, a $V_x$ line corresponding to a neuron which should output a value of 0 but erroneously outputs a value of 1 sets $V_x = V_{pp}$. Furthermore, a $V_y$ line corresponding to a pre-stage neuron which fires sets $V_y = V_{pp}$.

In this manner, it is possible to input a value of 1 with respect to neurons which erroneously output a value of 1, to selectively implant electrons only in those synapses which aided firing, and thus to reduce the weighting. That is to say, learning in accordance with Hebb's rules can be realized by the hardware itself. Conventionally, neural net learning was conducted by conducting calculations using an external large-scale computer on the basis of complicated learning rules, and based on the results of these calculations, rewriting the contents of each E²PROM one by one, so that learning required an enormous amount of time; however, by the means of the present invention, it was possible to greatly reduce the learning period.

Next, an experiment was conducted in which the learning of an EXCLUSIVE OR function was conducted with respect to a neural network having the simple construction shown in FIG. 20.

That is to say, learning was conducted in which the output had a value of "1" only when one or the other of inputs #1 and #2 was a high level input ("1"); however, the circuit was essentially unable to engage in self-teaching so as to output correct responses by means of simple Hebb rules.

That is to say, by means of simple learning rules in which the value of Z was always reduced in neurons which erroneously outputted a value of 1, and the value of Z was always increased in neurons which erroneously outputted a value of 0, learning did not occur, and a higher level learning algorithm was necessary.

Here, the method of BACK PROPAGATION (abbreviated BP), which is a learning method widely used in multi-layer neural networks, will be explained briefly. In BP, the update of synapse weighting is conducted in proportion to the product of the values of the error (in the case of the output layer, the difference between the teaching signal T and the output $O_K$ of the neuron), the differential of the output function, and the output of the pre-stage neuron (Formulas (14), (15)). In Formulas (14) to (17), reference k indicates the output layer, reference j indicates the pre-stage hidden layer, and reference i indicates the hidden layer which is at the further pre-stage thereof.

$$\Delta W_{kj} = \eta \delta_k O_j \quad (14)$$

$$\delta_k = (T_k - O_k) f'(Z) \quad (15)$$

Here, the product of the error and the differential of the output function is termed $\delta$.

In the hidden layer neurons, in the updating of the synapse weighting, a weighting average by means of the synapse weighting of $\delta$ of the output layer is used as the error in place of the difference between the output and the teaching signal. The update amount of the synapse weighting is determined by Formulas (16) and (17).

$$\Delta W_{ji} = \eta \delta_j O_i \quad (16)$$

[4]

$$\delta_j = \left( \sum_k W_{jk} \delta_k \right) f'(Z) \quad (17)$$

FIG. 21 shows a conventional BP. For the purposes of simplicity, Z is determined to have a value within a range from −1 to 1, and the threshold value is set at 0. Furthermore, $\delta$ indicates the case of the output layer. In conventional BP, a sigmoid function such as that shown in FIG. 21 is used as the output function, so that the amount of variation in synapse weighting is determined by the multiplication of analog amounts. Furthermore, the various functions must be realized by means of extremely complex analog circuitry. This not only necessitates a large number of elements; in order to realize analog amounts, a current flow is required, and large scale integration becomes essentially impossible.

The present invention provides a learning method which makes it possible to effectively allow a neural network to learn by means of extremely simple circuitry, and realizes a neural network chip possessing a self-teaching function.

DISCLOSURE OF THE INVENTION

The present invention comprises an artificial neural circuit containing: a plurality of synapse circuits, which output values of input signals multiplied by predetermined weighting values $W_i$, and a plurality of neuron circuits, which determine a total value (expressed by Z) representing the result of the linear addition of the output signals of a plurality of synapse circuits, and output a high level signal voltage when, with respect to a predetermined threshold $V_{TH}$, $Z>V_{TH}$, and output a low level signal voltage when $Z<V_{TH}$, characterized in that during the learning of each neuron circuit, with respect to learning of increasing the total value Z, only when $$V_{TH}-\epsilon<Z<V_{TH}+\alpha$$

with respect to two positive parameters $\epsilon$ and $\alpha$ is the weighting of predetermined synapse circuits which input signals into the $\epsilon$ neuron circuit increased by a predetermined positive value, and in the case of learning of decreasing the total value Z, only in the case in which $$V_{TH}-\alpha<Z<V_{TH}+\epsilon$$

is the weighted value of predetermined synapse circuits which input signals into this neuron circuit decreased by a predetermined positive value.

BEST MODE FOR CARRYING OUT THE INVENTION (Embodiment 1)

Figure 1:
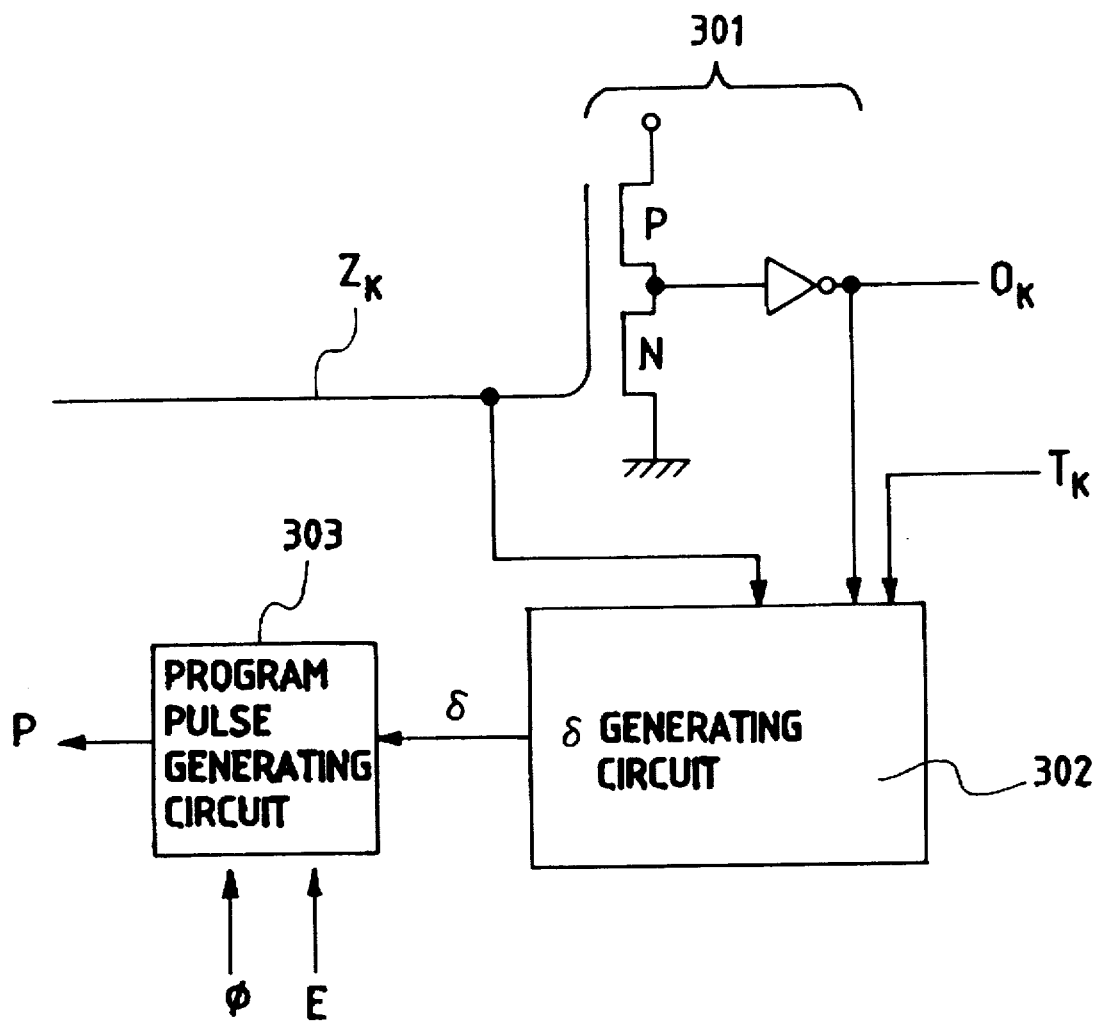
FIG. 1 is a circuit diagram of a semiconductor neural circuit device in accordance with a first embodiment of the present invention.
Figure 27:
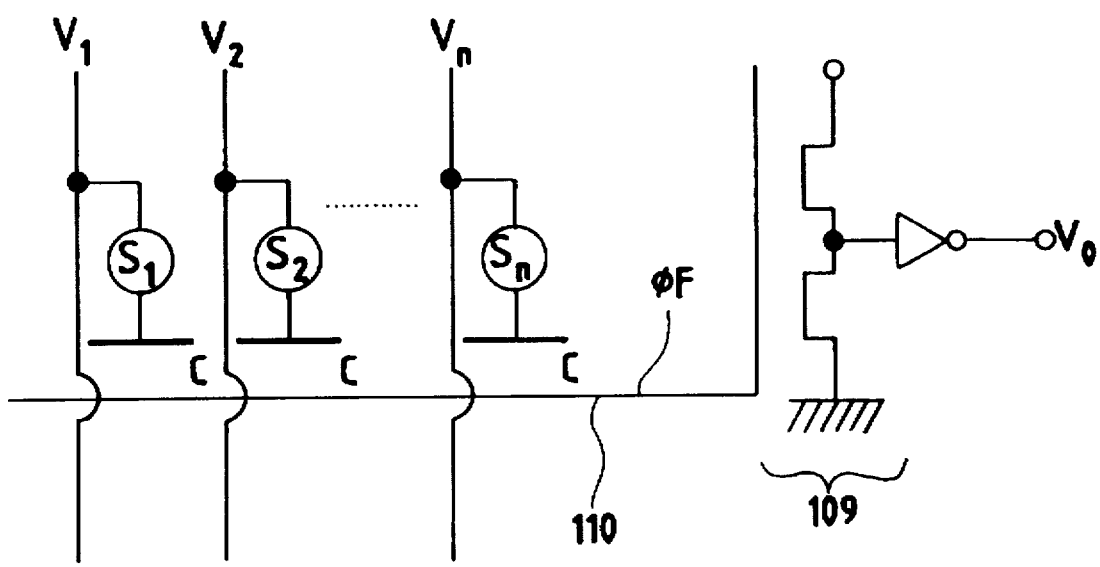
FIG. 27 shows the state in which the neuron shown in FIG. 22 is coupled to the output of a number of neurons n.
Figure 28:
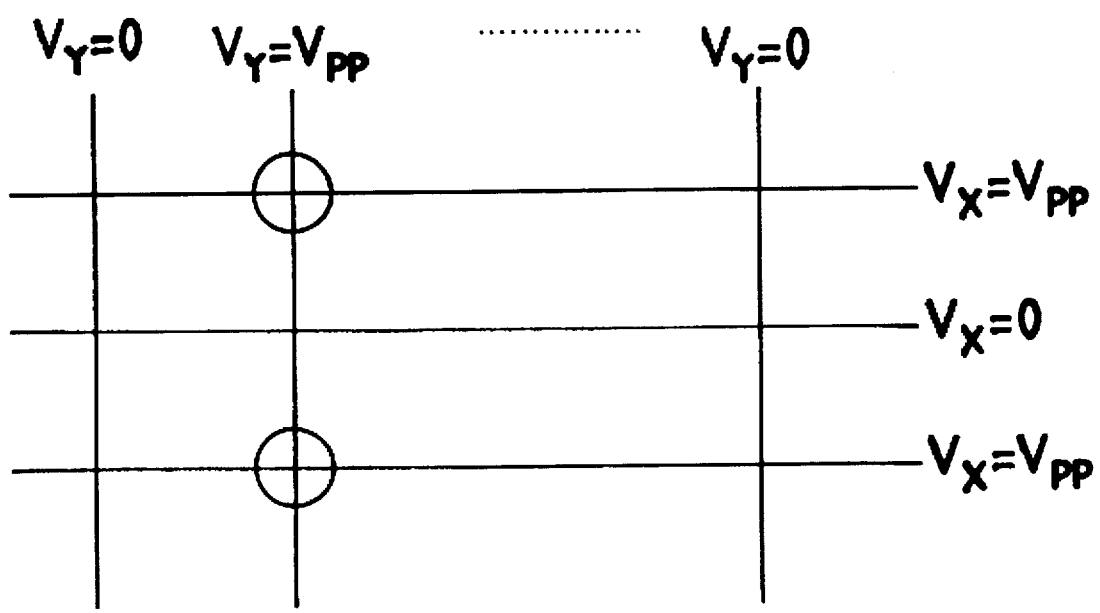
FIG. 28 is a conceptual diagram showing the increase in weighting of synapses positioned at wiring intersection points in FIG. 22.
Figure 29:
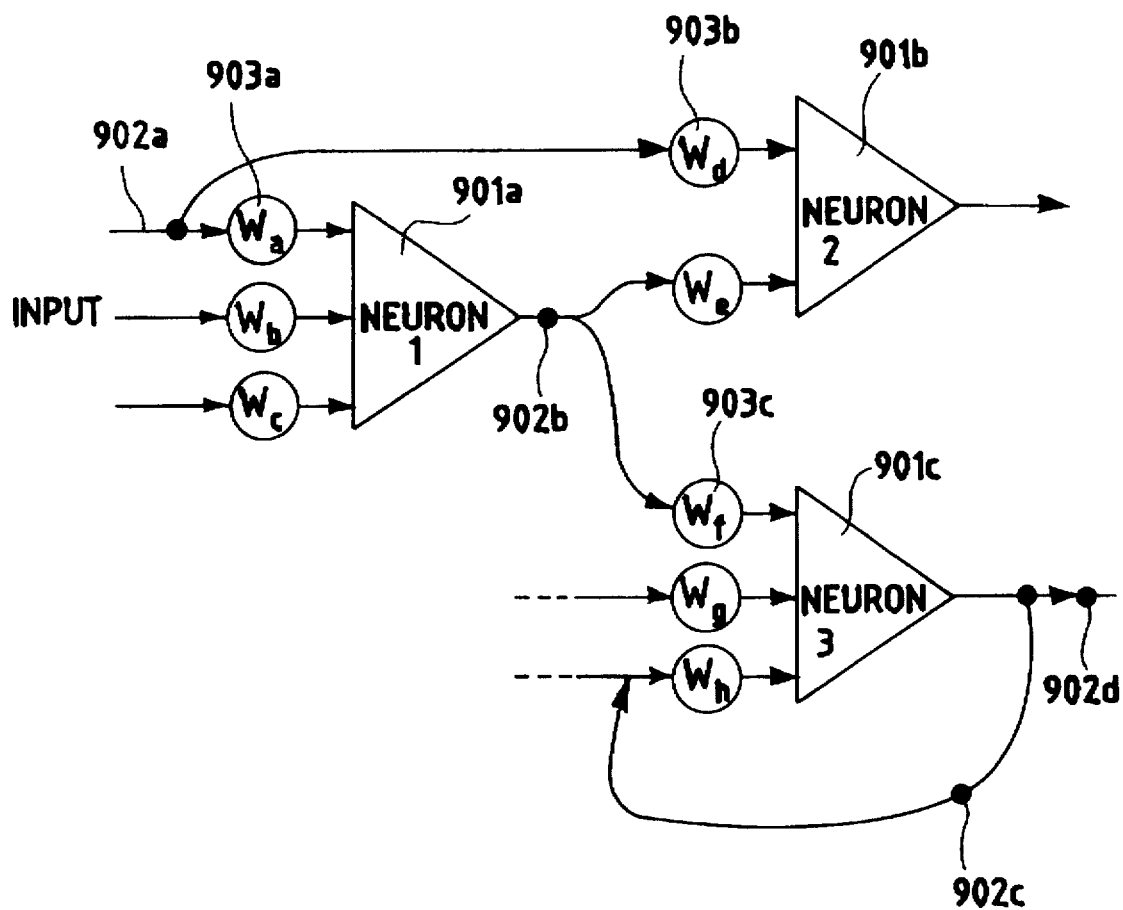
FIG. 29 shows a model of the composition of a fundamental unit of the brain.
Figure 30A:
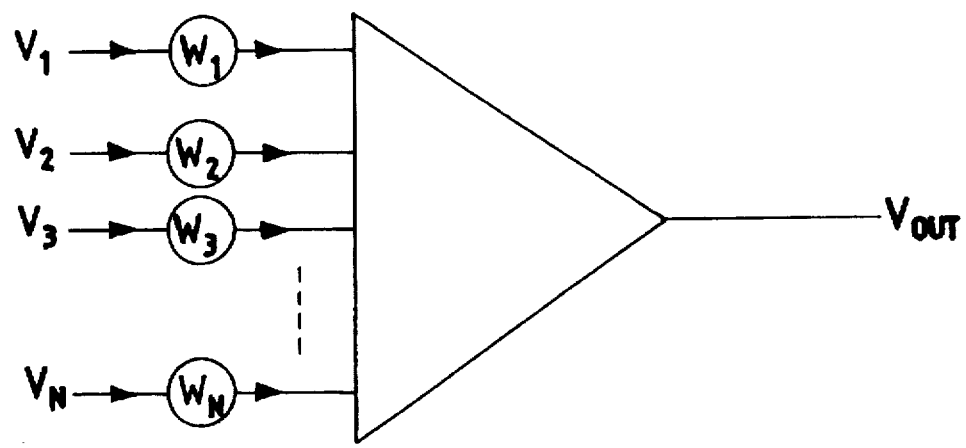
FIG. 30(a) is a conceptual diagram for explaining the function of one nerve cell, that is to say, one neuron.
Figure 30B:
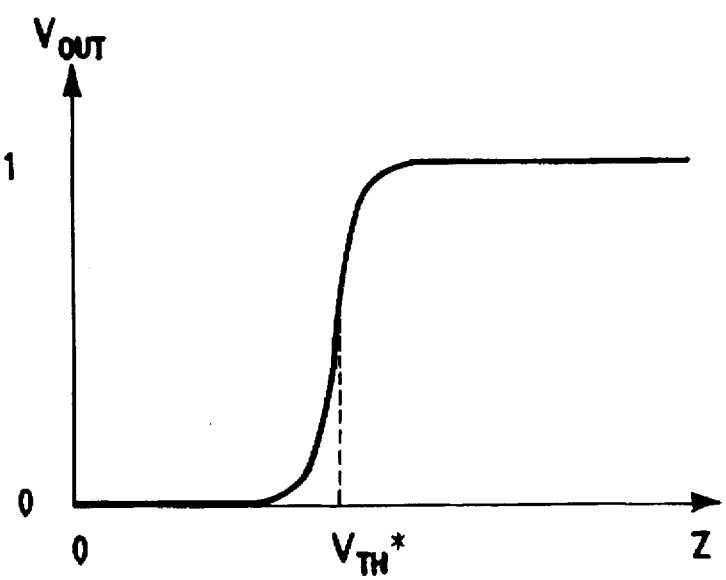
FIG. 30(b) is a graph showing the relationship between Z and $V_{out}$.
Figure 31:
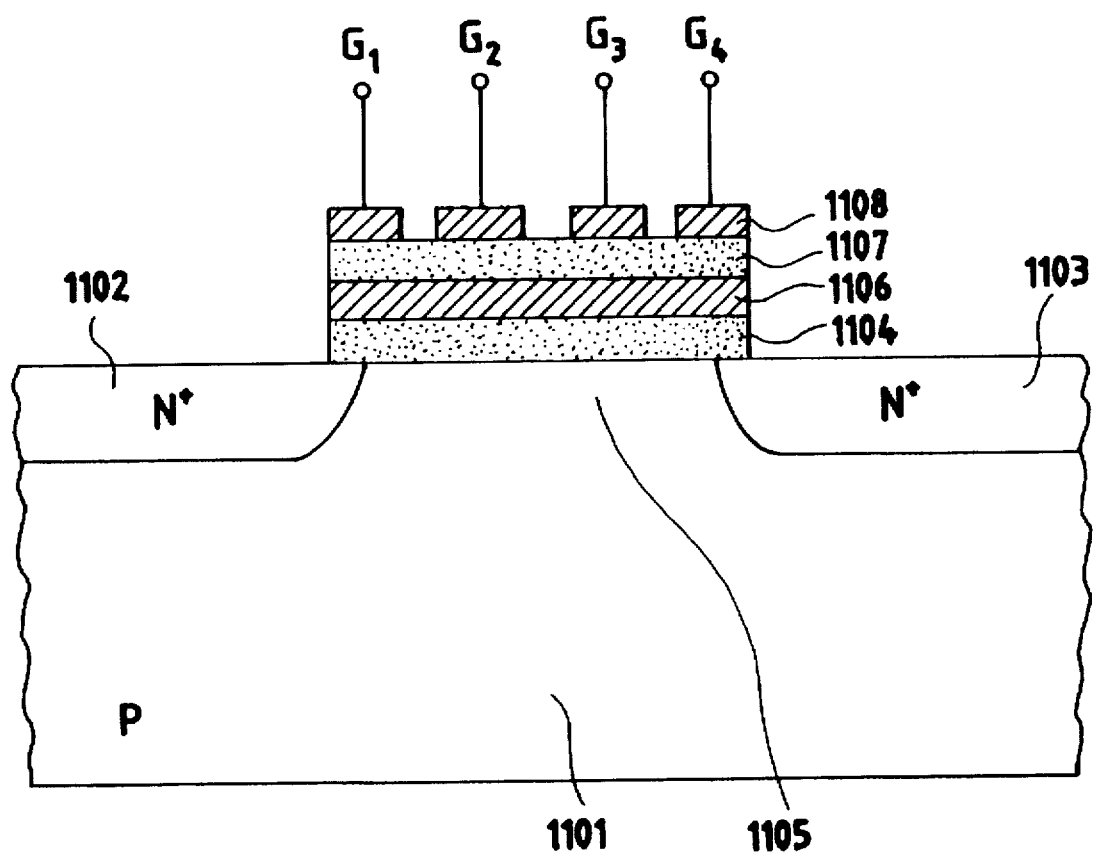
FIG. 31 is a conceptual diagram showing a simplified example of the vMOS structure.
Figure 32:
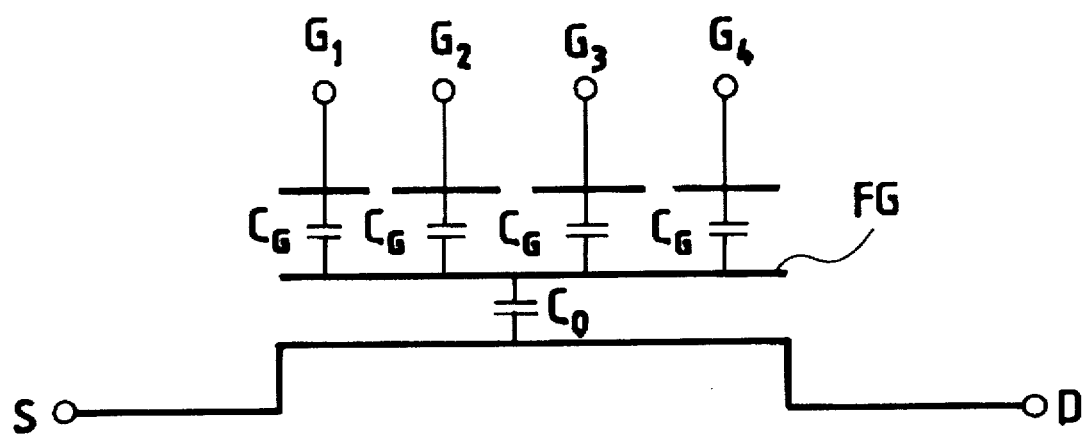
FIG. 32 shows the structure of FIG. 31 in a further simplified form.
Figure 33:
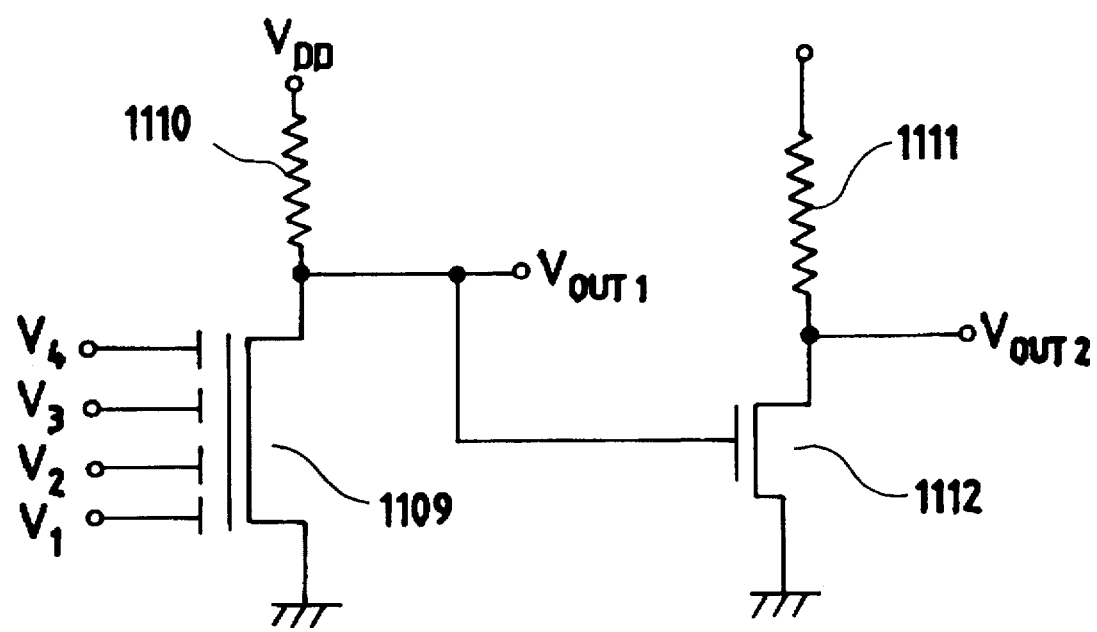
FIG. 33 is a circuit diagram of an inverter using the neuron element of FIG. 31.
Figure 34:
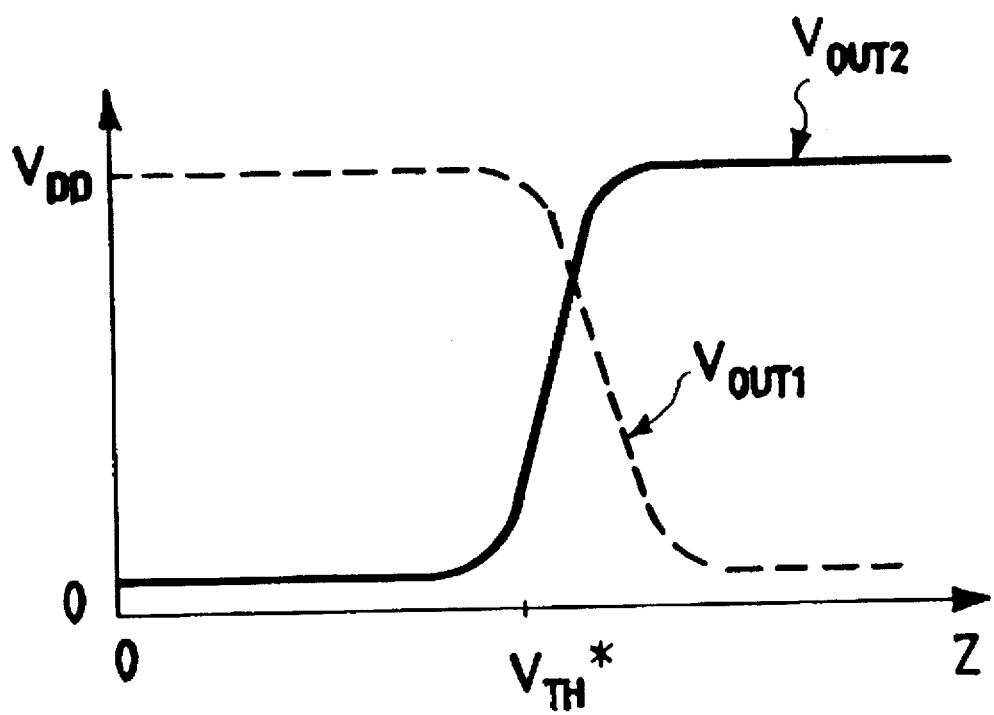
FIG. 34 is a graph showing $V_{out}$ and $V_{in}$ as a function of Z in the circuit of FIG. 33.
Figure 35:
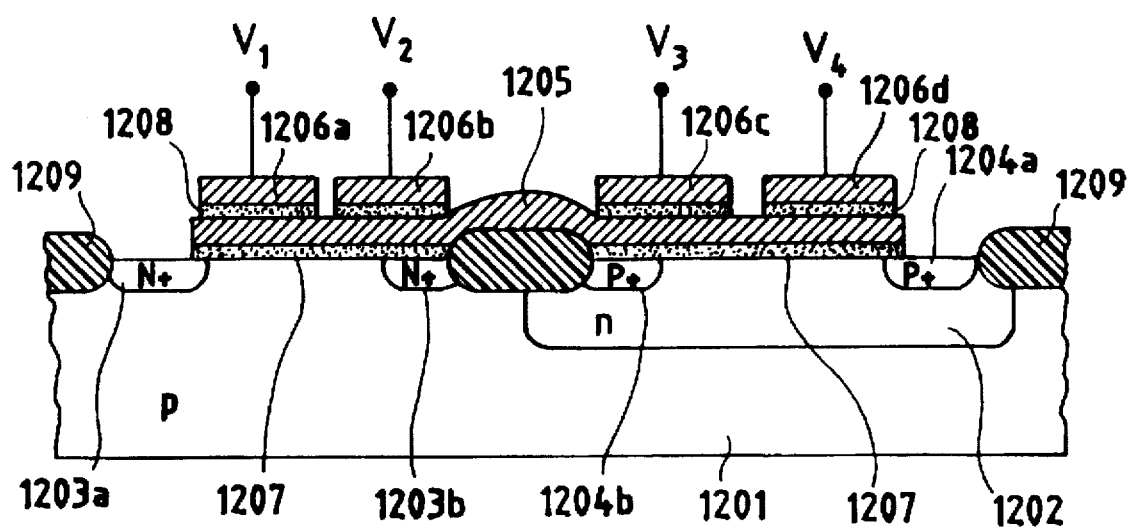
FIG. 35 shows the cross sectional structure of a CMOS neuron gate.
Figure 36:
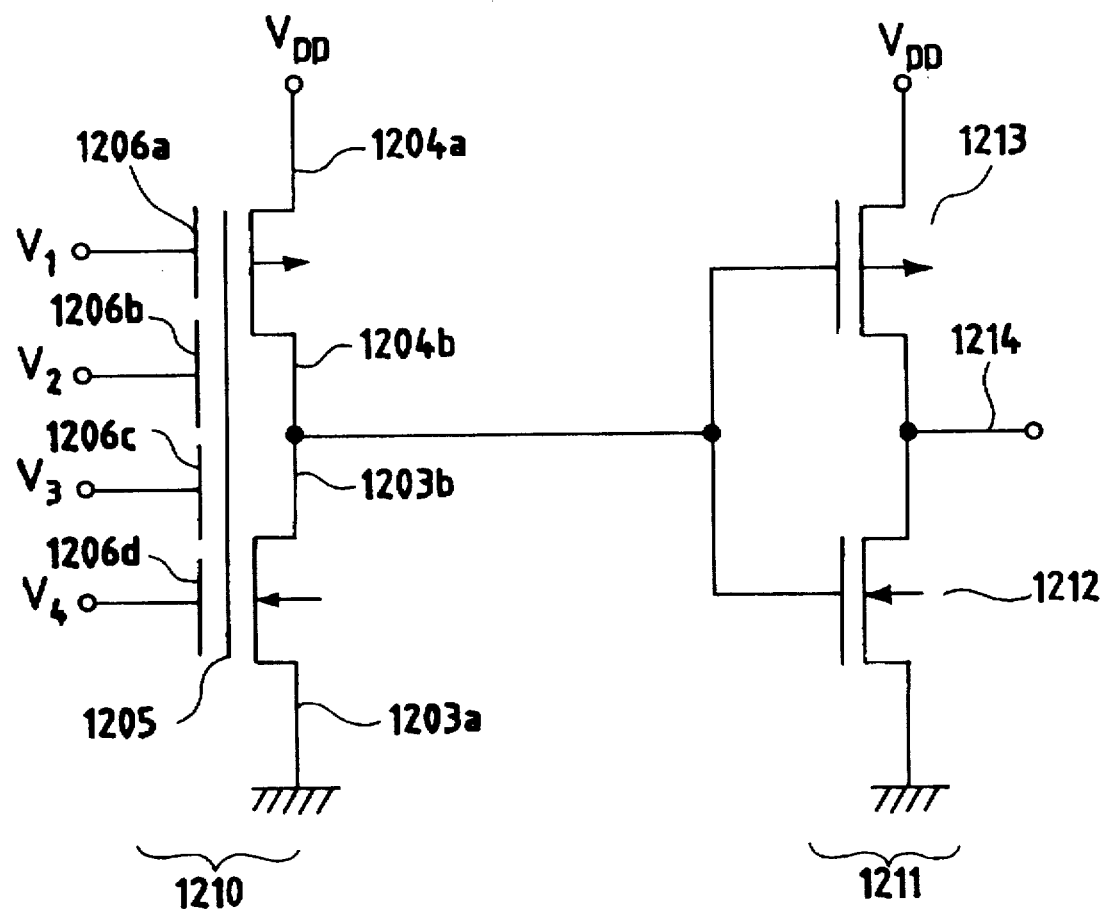
FIG. 36 is a circuit diagram showing the composition of one neuron circuit.
Figure 37:
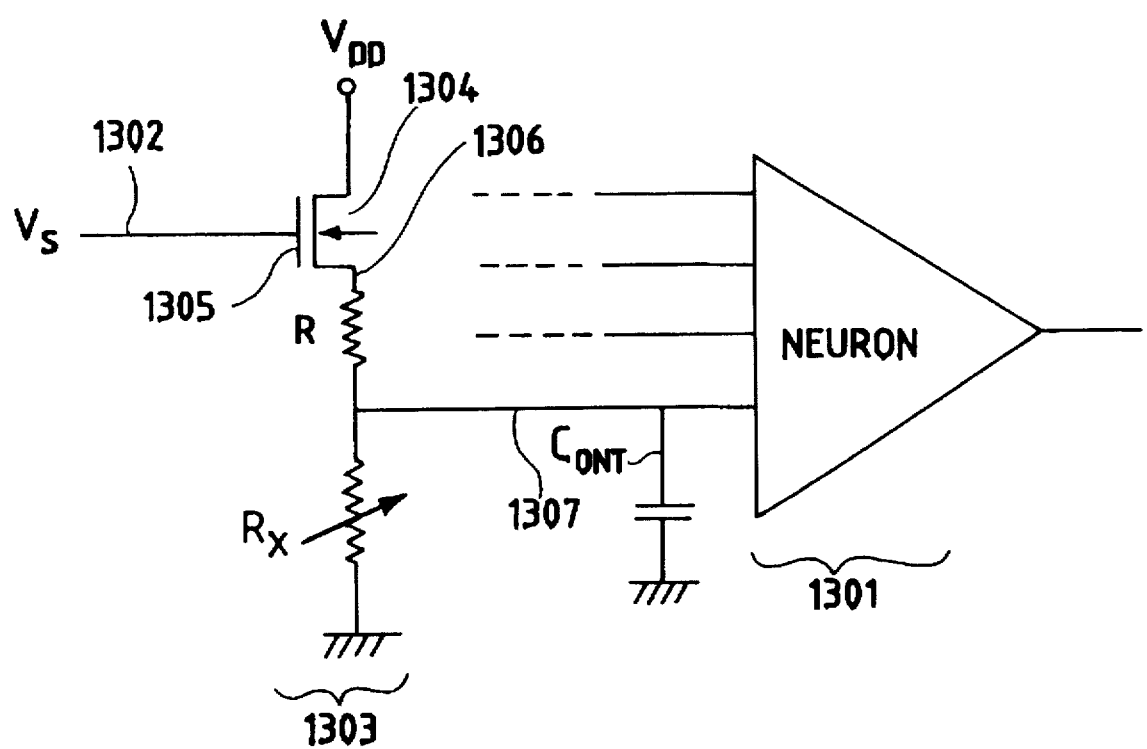
FIG. 37 is a circuit diagram showing an example of the basic composition of a neuron circuit including a synapse junction employing a vMOS transistor in accordance with the conventional technology.
Figure 38A:
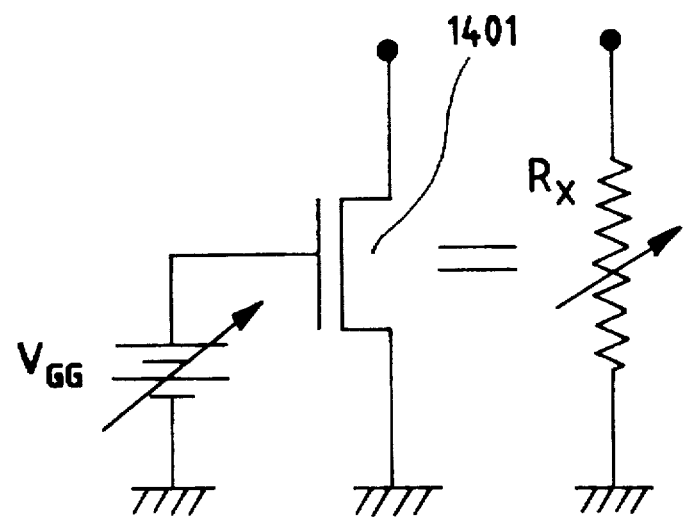
FIG. 38(a) is a circuit diagram showing an example of a method for the realization of variable resistance.
Figure 38B:
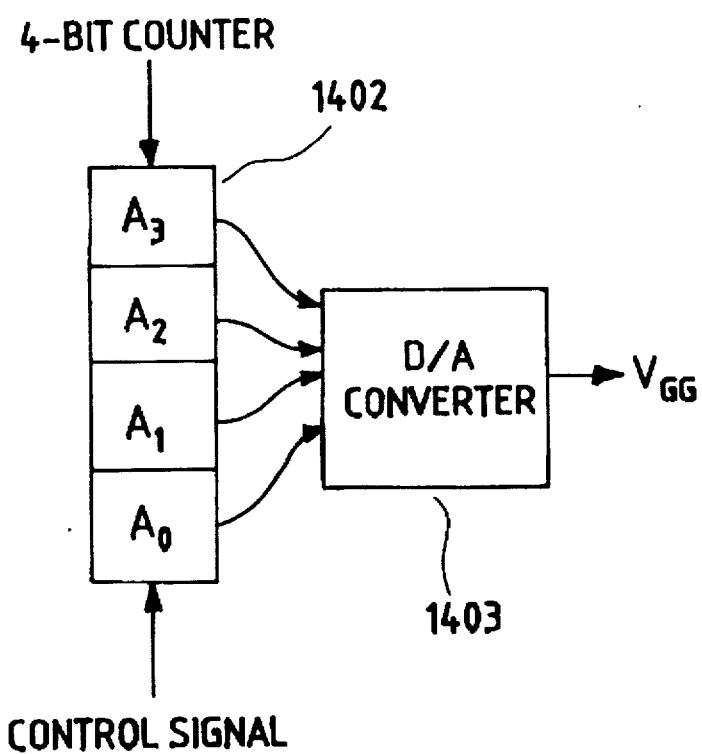
FIG. 38(b) is a circuit diagram showing an example of the control of the value of $V_{GG}$.

FIG. 1 is a circuit block diagram showing a first embodiment of the present invention; a portion of a neural network having a composition similar to that of FIG. 27 is shown.

Reference 301 indicates a neuron circuit; reference $Z_K$ indicates a potential corresponding to the total value of the inputs, and this is equivalent to the potential $\phi_F$ of the floating gate. Reference $O_K$ is the output signal of the neuron. Reference T, to which the letter K is appended in order to show this is a value of the output layer, indicates a teaching signal, which shows the correct answer, a value of 0 or 1.

Reference 302 indicates a δ generating circuit; it incorporates Z, $O_K$ and $T_K$ as input signals and outputs a δ signal. The δ signal has one of the three values 1, 0, and −1.

Reference 303 indicates a program pulse generating circuit; together with the δ signal, a signal E, which designates the education mode, is inputted thereinto. Reference $\phi$ indicates a pulse control signal; when $\phi=1$, the necessary program pulse P is outputted. P is connected to, for example, the program control electrode $V_X$ of the synapse circuit shown in FIG. 22.

The functions of the δ generating circuit are shown in Table 1.

Figure 21A:
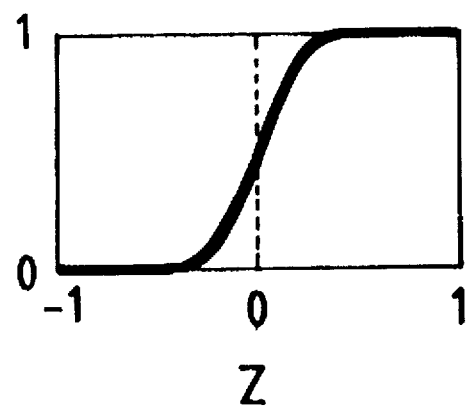
FIG. 21 shows a conventional BP.
Figure 21B:
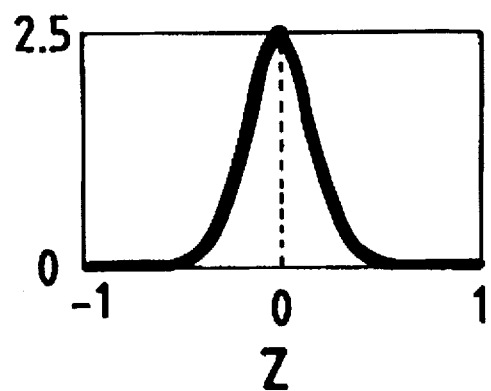
Figure 21C:
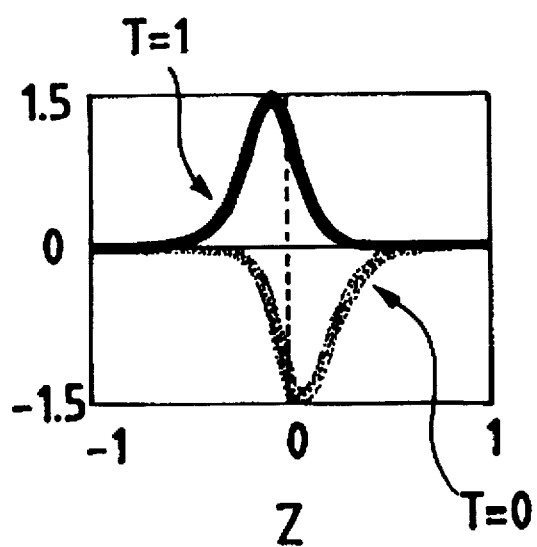
Figure 39A:
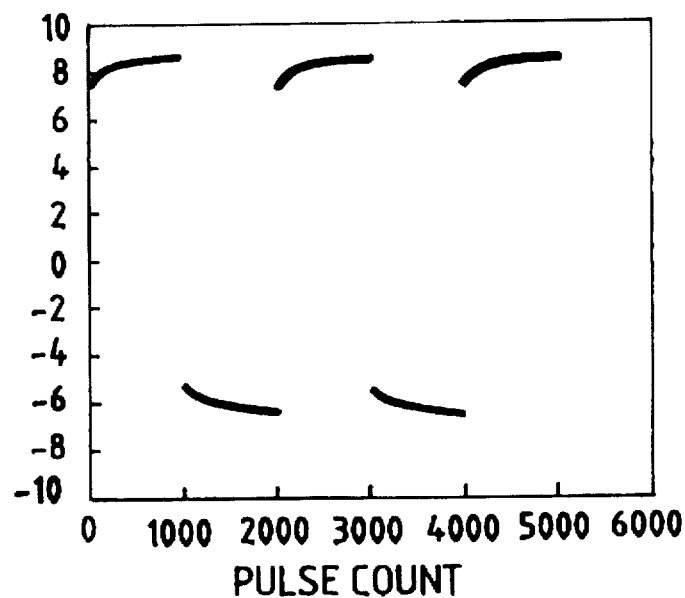
FIG. 39(a) is a graph showing the threshold voltage ($V_{TH}$) of a E²PROM cell possessing a tunnel junction, as a function of the number of pulses used for data writing.
Figures 1, 39B:
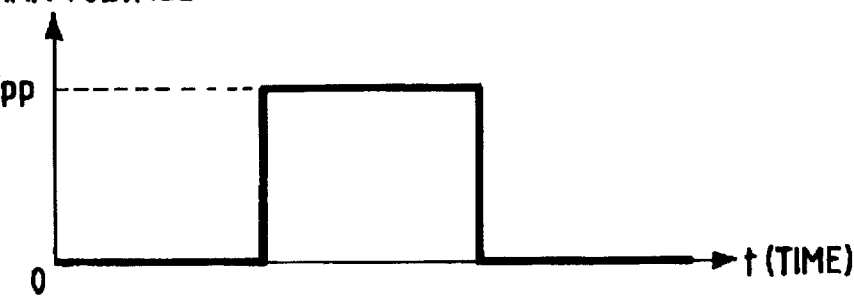
FIG. 39(b) is a graph showing the state of the variation over time of the number (n) of electrons implanted in the floating gate during the application of a positive program voltage in the manner of a step function.
Figures 2, 39B:
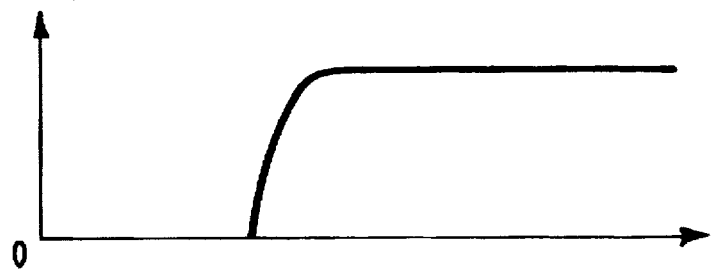
FIG. 2 shows the characteristics of the learning algorithm in accordance with the circuit construction shown in FIG. 1.

Using FIG. 2, the characteristics of the learning algorithm in accordance with the circuit structure shown in FIG. 1 will be explained and compared to the original BP shown in FIG. 21. Here, for the purposes of simplicity, as in FIG. 21, the values which Z may have are set within a range of −1 to +1, and the threshold value $V_{TH}$ of the neuron is set to 0.

The algorithm of the present invention simplifies the learning in the conventional BP in order to realize it in a simple manner in hardware, and is termed hardware back propagation (HBP). In HBP, the output function of the neuron, the differential of the output function, and δ use functions of {0,1} or {−1,0,1} (FIG. 2).

A step function is used as the output function of the neuron, so that the differential of the output function is the differential of a step function, and this does not exist. Thus a window function such as that shown in FIG. 2(B) is employed. The width of the window function is termed the LEARNING REGION WIDTH, and is represented by ε. As shown in FIG. 2, this function can be realized in a simple manner by means of a logical circuit employing νMOS. δ is the product of the error ($T_K$−$O_K$) and the differential of the output function (FIG. 2(B)), and the form of the function in which α=0 is shown in FIG. 2(C). However, in the learning algorithm of the present invention, α, a new parameter having a limited positive value, is introduced.

For example, when T=1, if Z>$V_{TH}$(=0), then O=1, and a correct answer will be returned; however, the algorithm does not recognize the correct answer until Z>α. That is to say, when $0 \leq Z \leq \alpha$, even if the answer is correct, δ=1 will result, and furthermore, learning to increase the value of Z will be conducted. Here, α is referred to as the MARGINAL LEARNING REGION, and indicates a region in which learning is insufficient. This parameter is introduced so that, by means of allowing sufficient learning until Z>α, thereinafter, even if fluctuations are produced in the charge within the floating gate of the synapse circuit as a result of changes over time, the circuit will not operate erroneously. δ is thus expressed by means of ε and α, as shown in FIG. 2 (C). In the hidden layer, a weighting average is obtained by means of the synapse weighting of values of δ in the output layer, and when this value is positive, δ has a value of 1, while when the value is negative, δ has a value of −1, and when this value is 0 (when all values of δ in the output layer are 0 or the weighting average is 0, that is to say, learning was not necessary), δ has a value of 0, and in this manner, the three values of −1, 0, and 1 are obtained.

An average value of δ in the output layer to which a synapse weighting value has been applied can be easily realized in circuitry using νMOS. Furthermore, based on this average value, circuitry which determines the value of δ with respect to each neuron in the hidden layer can also be easily realized using νMOS in a similar manner.

Next, the effectiveness of the hardware back propagation (HBP) algorithm in accordance with the present invention for high-speed learning will be shown using the results of a simulation.

Figure 3:
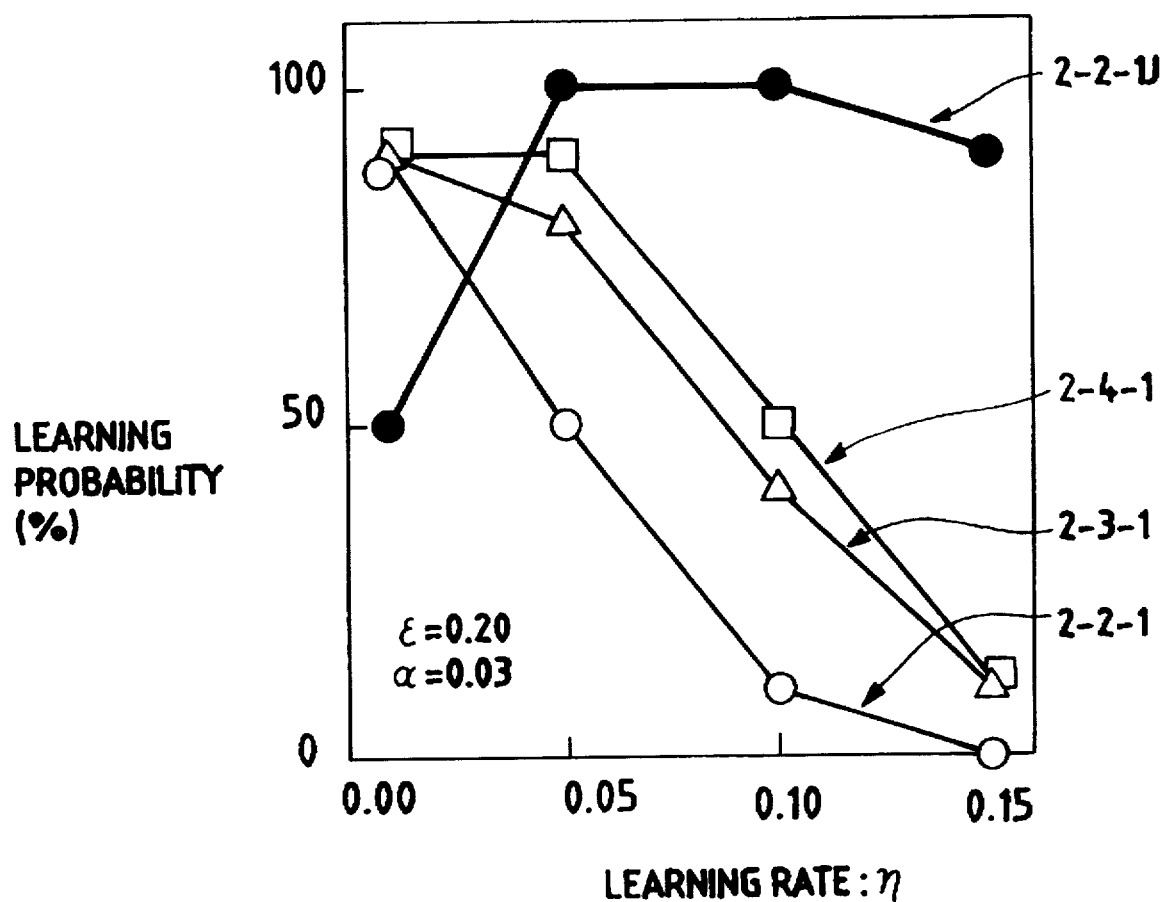
FIG. 3 shows a plot of the convergence probability with respect to the learning rate.

The sample used in the learning was the simplest linearly non-divisible problem, the two-input EXCLUSIVE OR (XOR); the sample was obtained randomly. First, the probability of convergence on the correct response was investigated with respect to a structure which is commonly used in two-input XOR learning: a network having a three-layer structure comprising two input unit neurons, two hidden unit neurons, and one output unit neuron (referred to in abbreviated form as 2-2-1). The convergence probability represented the probability of the network learning the XOR function with respect to ten types of initial states in which the synapse weightings had differing initial values. In FIG. 3, the convergence probability is plotted with respect to the LEARNING RATE. Here, the meaning of LEARNING RATE η is that the value of the amount of change in the weighting of the synapse during one learning operation cycle has one of the three values +η,0, and −η.

As is clear from the Figure, 100% convergence was not obtained with respect to any η, and furthermore, even if the number of neurons in the hidden layer was increased from 2 to 3 or 4, the convergence probability was not greatly improved. When an investigation was conducted with respect to a network such as that shown in FIG. 20, in which synapse junctions were present which connected the input layer with the output layer, jumping over the hidden layer (shortened to 2-2-1J), it was determined that 100% convergence was obtained (the darkened circles in FIG. 3).

Figure 4:
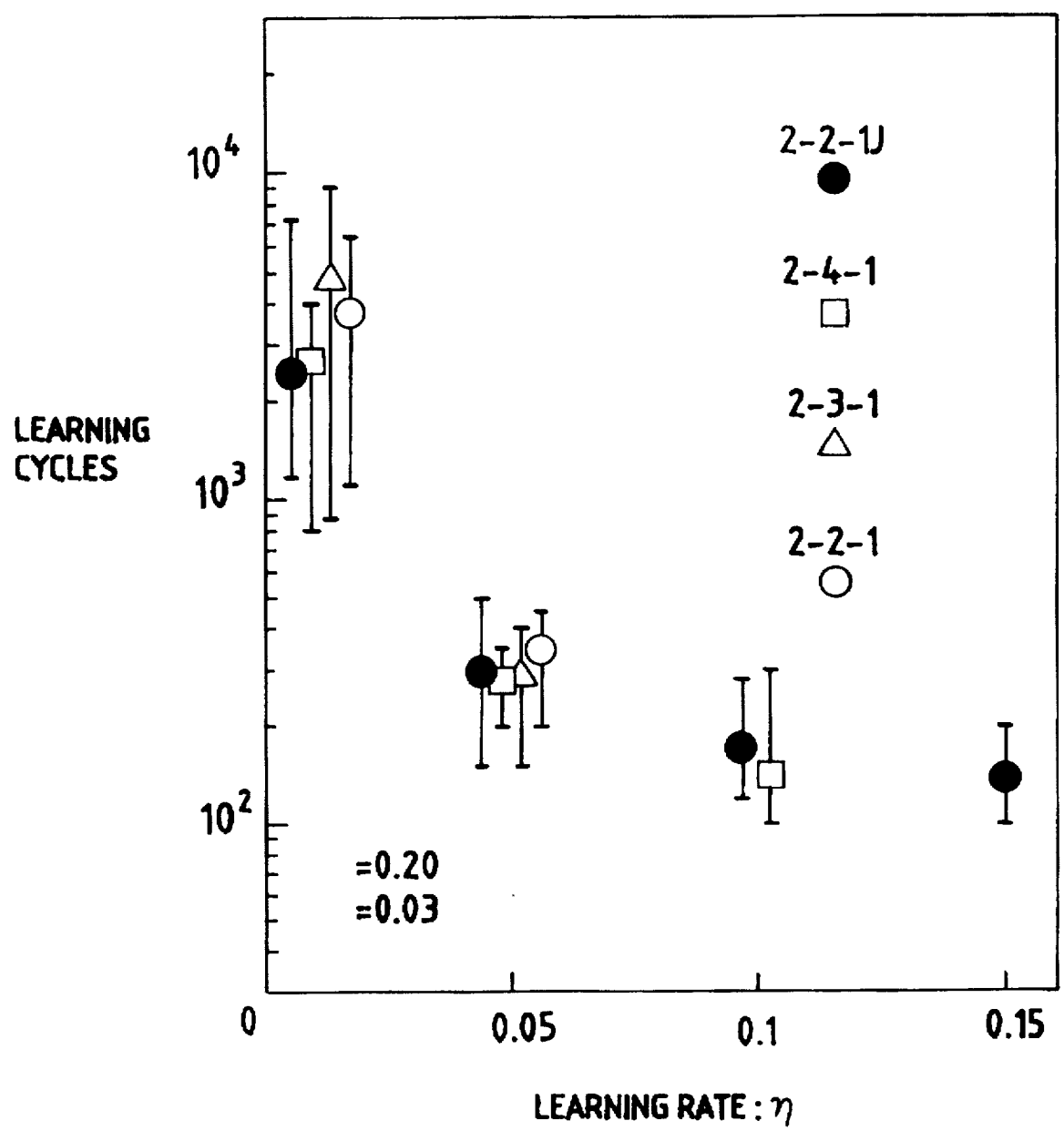
FIG. 4 shows a plot of the learning cycles necessary for convergence with respect to $\eta$.

In FIG. 4, the number of learning cycles required for convergence in the above four types of structures is plotted with respect to η. In the case of each structure, the number of learning cycles did not depend on the network structure, but rather on η, and the larger the value of η, the fewer the number of learning cycles required for convergence. From FIGS. 3 and 4, in the HBP algorithm, a structure possessing junctions which jumped over the hidden layer obtained a convergence probability of 100% in comparison with structures which did not have such junctions, and furthermore, optimal η was large, so that quicker learning was possible.

When a comparison such as that in FIG. 3 was attempted with learning using conventional BP, even if a structure jumping over the hidden layer was introduced, almost no improvement was observed in the learning probability.

The structure possessing synapse junctions which jump over the hidden layer is a structure which is often seen in biological neural circuit nets; the fact that when this structure is present, learning by HBP is improved, shows that HBP is a superior algorithm which is closer to biological processes.

Next, the results of the optimization of parameters η, ε, and α, which are used in HBP, using a 2-2-1J network which is effective in HBP, will be discussed.

Figure 5:
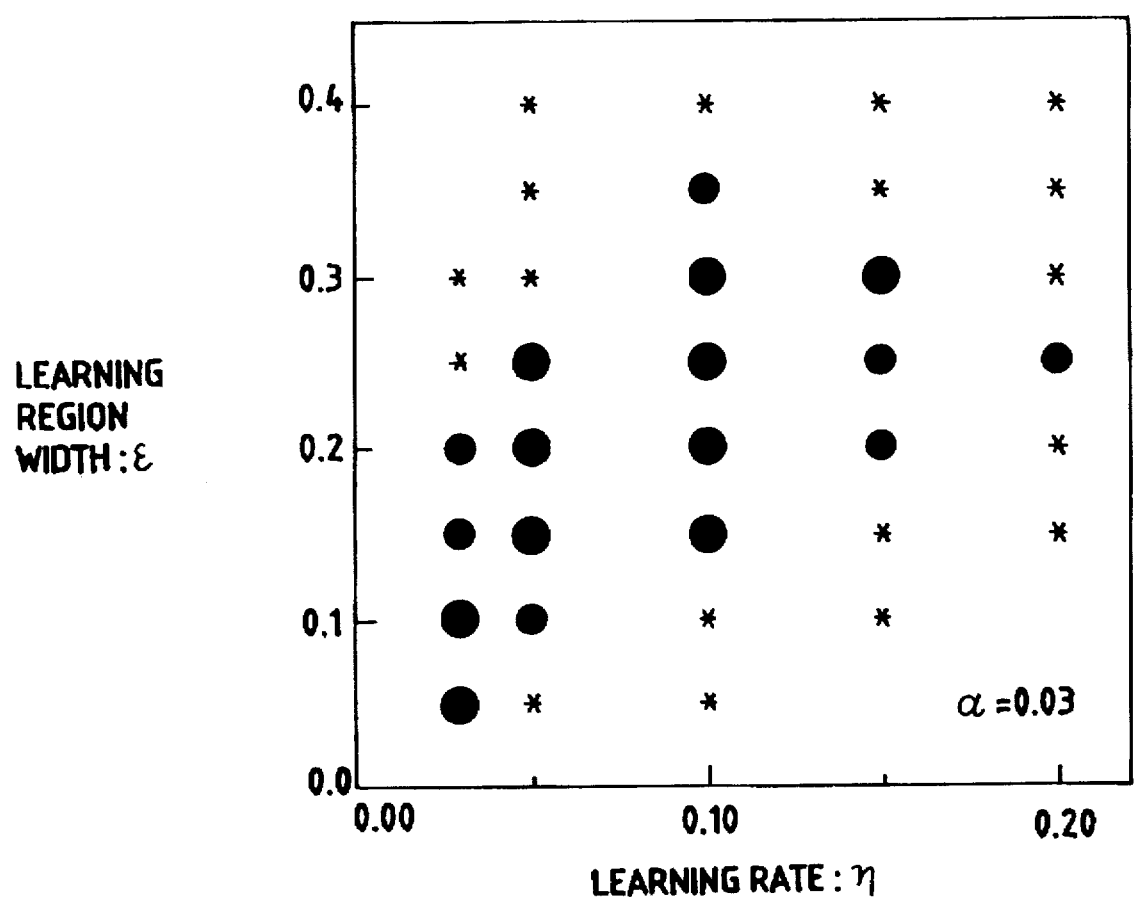
FIG. 5 shows the results of an optimization of the parameters $\eta$, $\epsilon$, $\alpha$ employed in HBP.

In FIG. 5, when α was fixed at 0.03, the conditions of η and ε under which the convergence probability was 100% are indicated with blackened circles. When $\epsilon \geq 0.4$, the probability of learning is less than 90%. That is to say, under conventional Hebb rules (corresponding to α32 1), 100% learning could certainly not be realized. From the diagram, it can be seen that the optimal conditions are those in which ε is 0.4 or less, and the ratio of ε and η is within a range of 1.25~3.5. It is further preferable that ε be 0.35 or less, and that (ε/η)=2~3.

Figure 6:
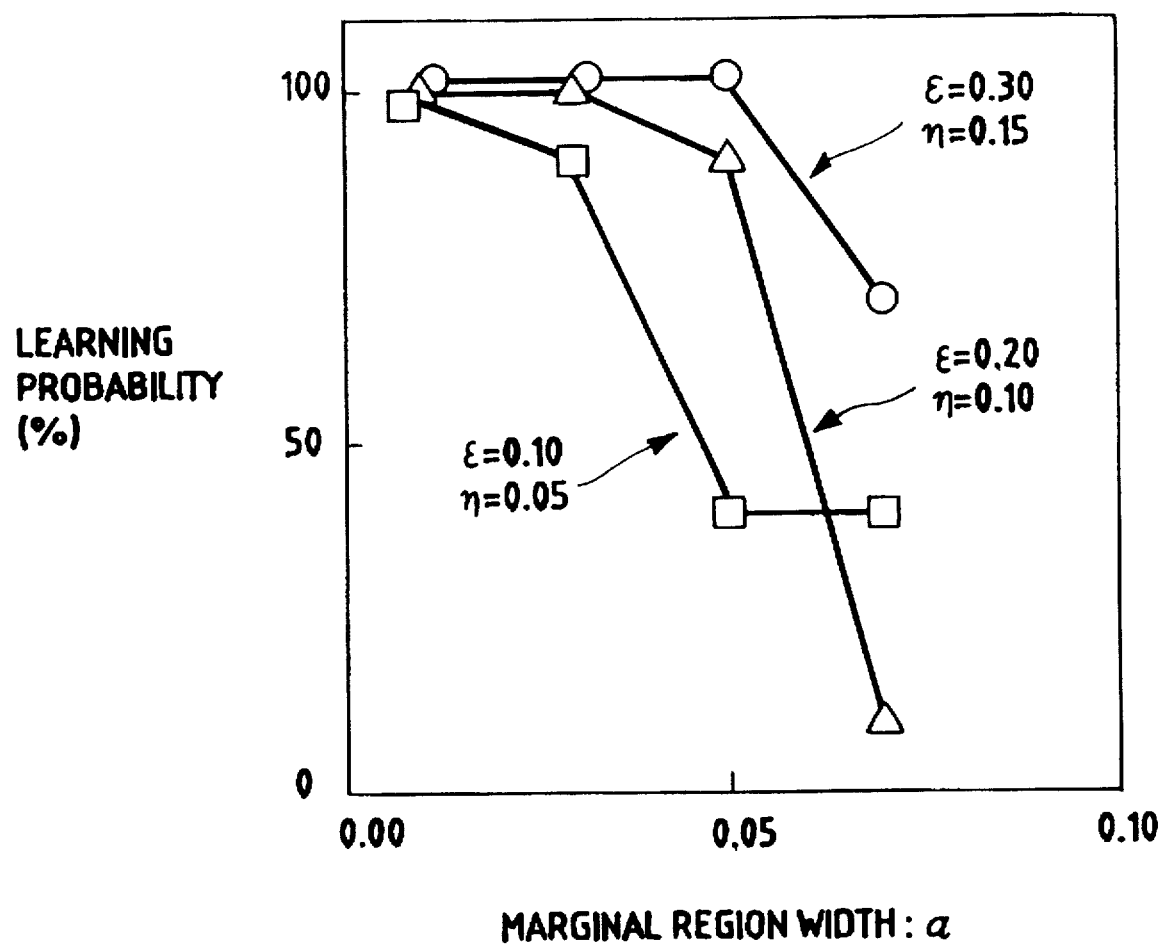
FIG. 6 shows the results of an optimization of $\alpha$ when $\epsilon/\eta$ is fixed at 2.

Next, FIG. 6 shows the case in which ε/η was fixed at 2, and α was optimized. Since α is a parameter which provides reliability in network operation, it is preferable that it be large. From the above, it can be seen that α=0.03 ~0.05 is appropriate.

Figure 20:
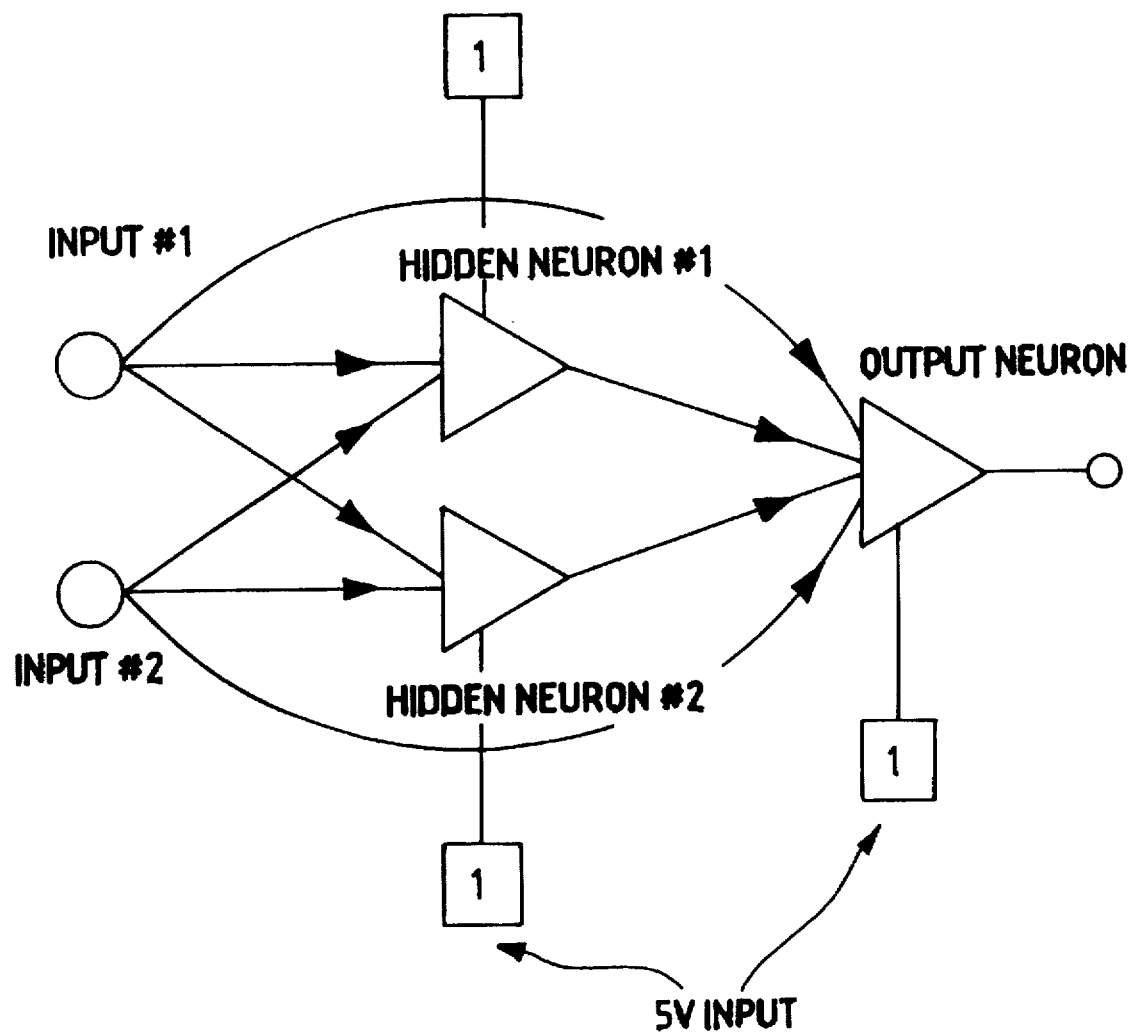
FIG. 20 is a conceptual diagram showing a neural network on which an experiment was conducted to allow the learning of a conventional EXCLUSIVE OR function.

These parameters represent optimization results which were obtained with respect to the structure shown in FIG. 20; it is of course the case that differing values may be employed with respect to other structures.

In general, it is preferable that ε always have a value larger than that of α. That is to say, ε>α. This is so for the following reasons. ε indicates the range necessary for correction when an error has been made, and is an important parameter for obtaining a correct result.

On the other hand, α is a parameter which serves to reinforce learning even when a correct result has been returned, so that a result which has been learned once cannot be, so to speak, forgotten. It is of course the case that the parameter ε, which determines the original learning range, should be made larger, and this was shown by the results of the simulation as well.

Figure 22:
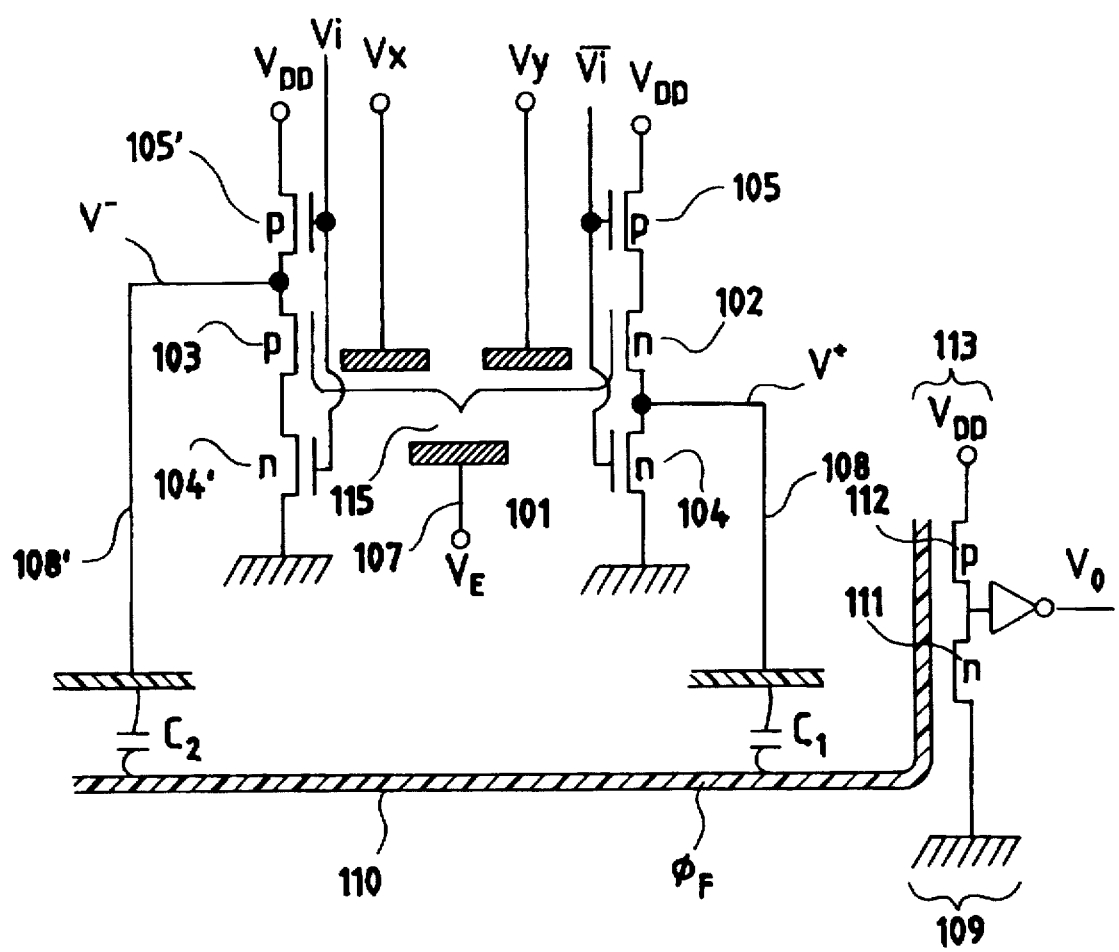
FIG. 22 is a conceptual diagram of related art.
Figure 23:
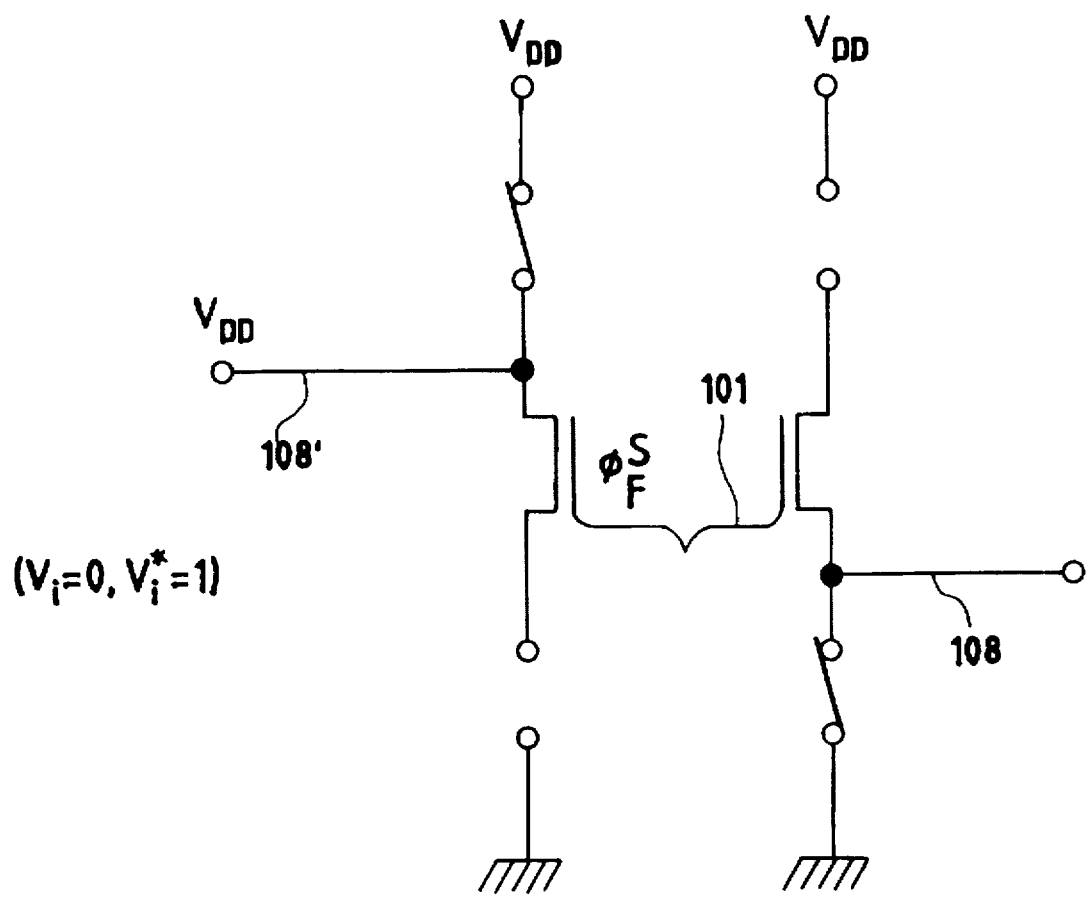
FIG. 23 is an equivalent circuit diagram showing a time at which the pre-stage neuron shown in FIG. 22 does not fire.
Figure 24:
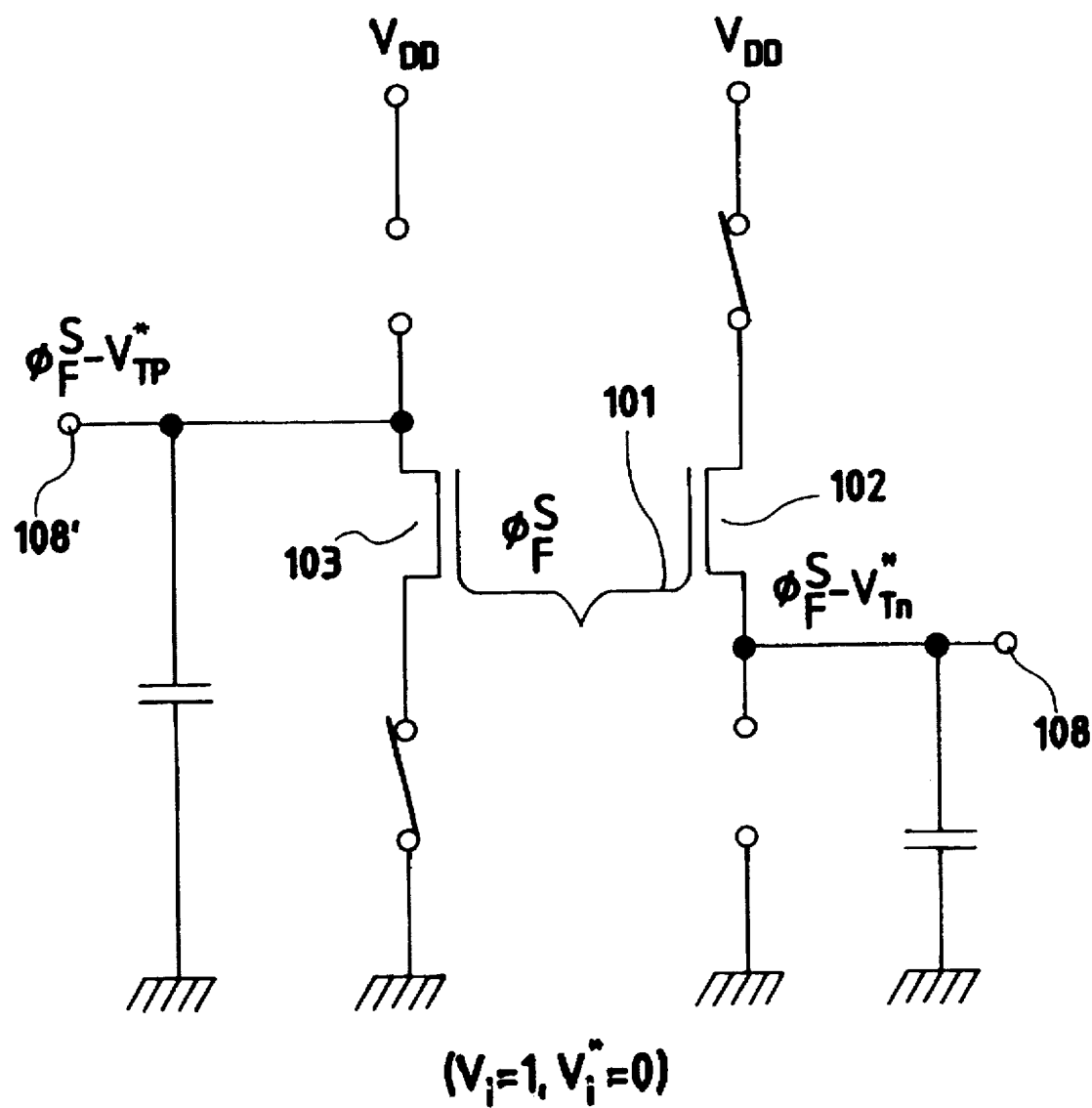
FIG. 24 is an equivalent circuit diagram showing a time at which the pre-stage diagram shown in FIG. 22 fires.
Figure 25A:
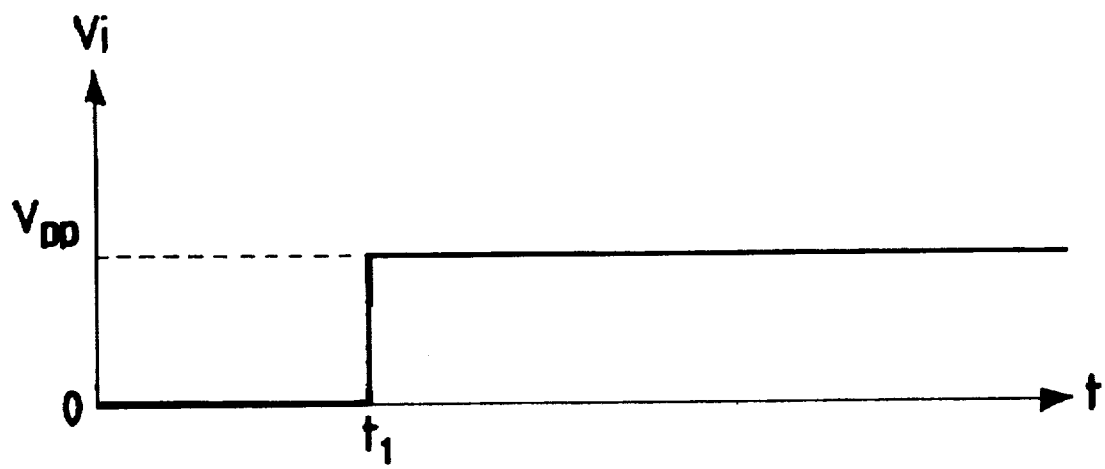
FIG. 25 shows the variation in the relaxation of $V^+$ and $V^-$ after the firing of the pre-stage neuron shown in FIG. 22.
Figure 25B:
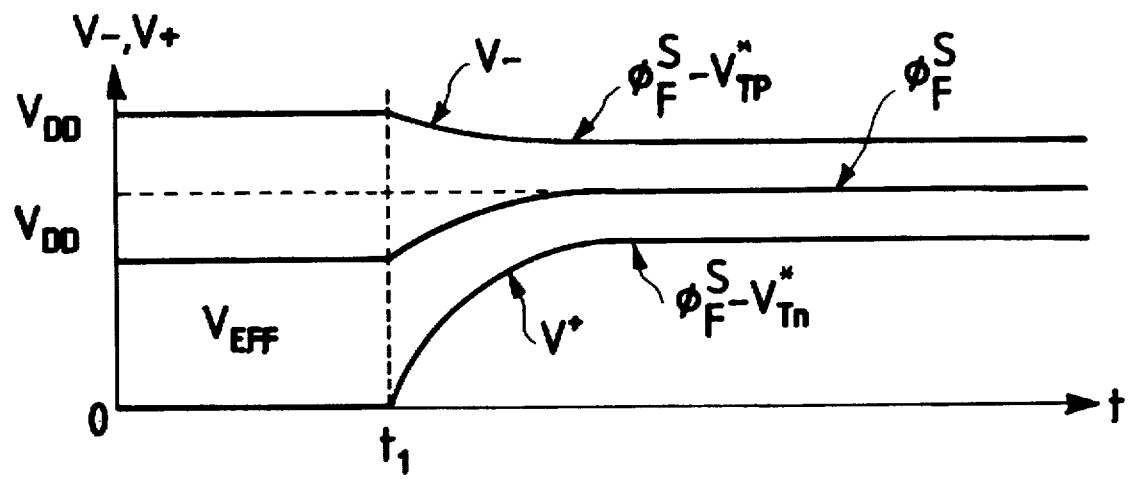
Figure 26:
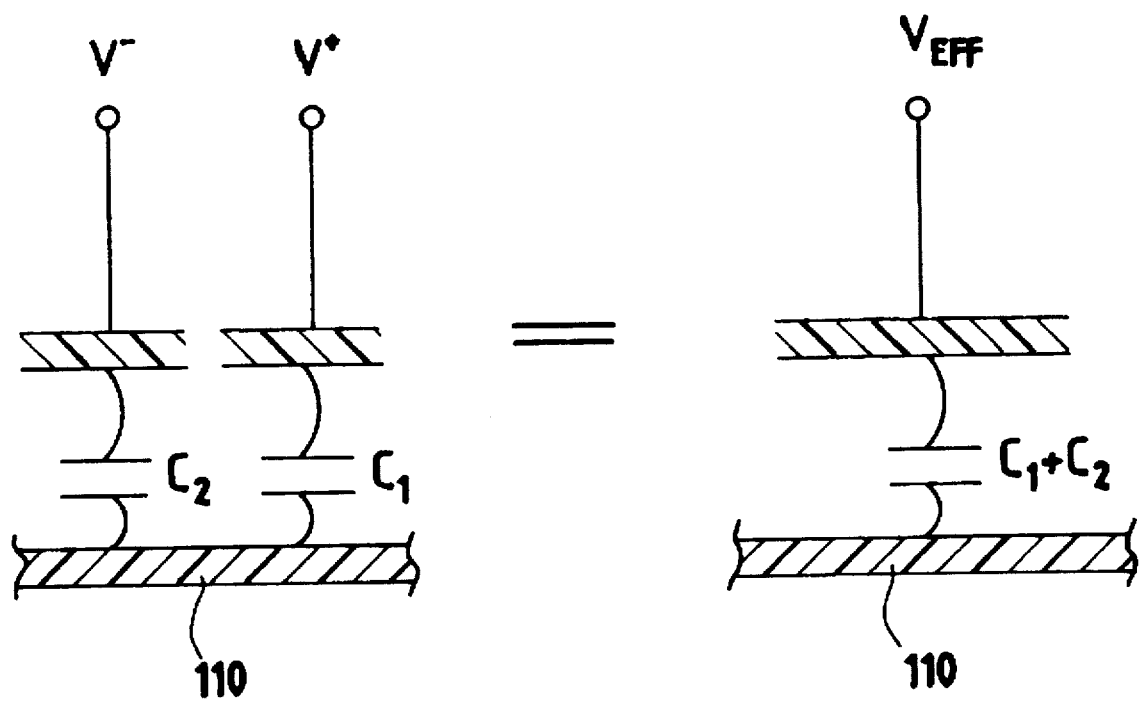
FIG. 26 shows the coupling effect of capacitors $C_1$ and $C_2$ in FIG. 22.

As explained above, in the learning algorithm which was realized by the circuit shown in FIG. 1, which represents a first embodiment of the present invention, the analog amount was simply the linear sum (Z) of the synapse weighting values and the neuron inputs, and these can be realized in an extremely simple manner by vMOS circuits. That is to say, as shown in FIG. 22, the synapse weighting values are given by the amount of charge within the floating gate of the synapse circuits, and Z is expressed as the potential of the floating gate of the neuron circuit which determines the results of the capacitive coupling, so that the problems present conventionally, the causing of a direct current flow and the enormous increase in power consumption, are not present. Furthermore, if the delta generating circuit employs vMOS, as shown in the second embodiment, it is possible to construct a circuit in an extremely simple manner, so that it becomes possible for the first time to realize a self-teaching function on a chip.

Furthermore, by means of exhibiting the new parameter α, the forgetting of learned items as a result of changes over time (corresponding to the fluctuations in the floating gate charge) is eliminated, and it becomes possible to realize a neural net having high reliability.

The circuit of FIG. 1 is shown in a block diagram, and the concrete circuit diagram and the like is not shown; however, the realization of the functions shown in Table 1 and FIG. 3 can easily be accomplished by means of presently available digital circuit technology, and it is the case that any sort of devices may be used in order to realize these functions. CMOS circuits, bipolar circuits, or bi-CMOS circuits or the like may be employed.

However, if vMOS circuit technology is employed, realization is possible using an extremely small number of elements, and this is extremely advantageous for ultra LSI.

TABLE 1

Functions of the δ Generating Circuit

| $O_k$ | T | Value of δ | Change in Synapse Weighting W |
|---|---|---|---|
| 0 | 0 | δ 0 | No change (ΔW = 0) |
| 1 | 1 | δ= 0 | No change (ΔW = 0) |
| 0 | 1 | If $V_{TH} - \epsilon < Z_K < V_{TH} + \alpha$, then δ = 1, otherwise δ = 0. | When δ = 1, electron discharge from floating gate (ΔW > 0) |
| 1 | 0 | If $V_{TH} - \alpha < Z_K < V_{TH} + \epsilon$, | When δ = −1, electron |

TABLE 1-continued

Functions of the δ Generating Circuit

| $O_k$ | T | Value of δ | Change in Synapse Weighting W |
|---|---|---|---|
| | | then δ = −1, otherwise δ = 0. | implantation in floating gate (ΔW < 0) |

(Embodiment 2)

A second embodiment of the present invention will be explained using FIGS. 7–13.

Figure 7:
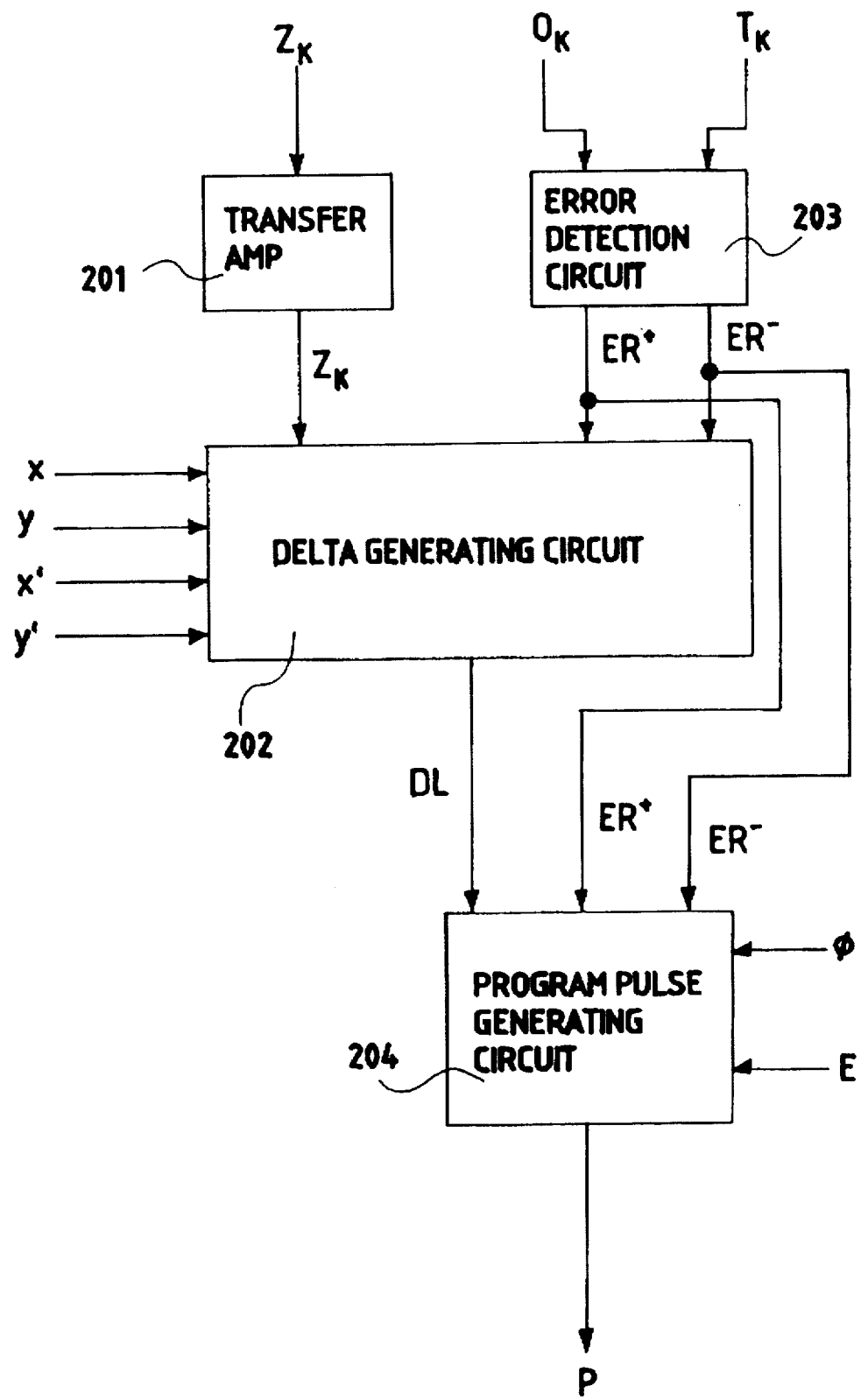
FIG. 7 is a block diagram of a neural network showing a third embodiment of the present invention.

FIG. 7 shows a more detailed block diagram of the inner portions of the δ (delta) generating circuit of FIG. 1.

Reference $Z_K$ indicates the floating gate potential of a neuron circuit; this is amplified by transfer amp 201, and is transmitted to delta generating circuit 202. A mutually-complementing-type vMOS source follower circuit such as that shown, for example, in FIG. 8 may be employed as this transfer amp. That is to say, the gate electrode 2203 of the NMOS (2201) and the PMOS (2202) is made floating, and is directly connected to the floating gate of the neuron circuit (for example, reference 110 in FIG. 22). If depression-type transistors, for example, are used for both the NMOS and PMOS, then the circuit becomes one in which the floating gate potential $Z_K$ can be directly read out with a voltage gain of 1. Even if this circuit is attached to the floating gate of a neuron, no fluctuation will be caused in the potential thereof. By making the current driving force of the NMOS and PMOS sufficiently large (that is to say, by making the W of the transistors large), it is possible to charge the next stage at sufficiently high speed.

Figure 8:
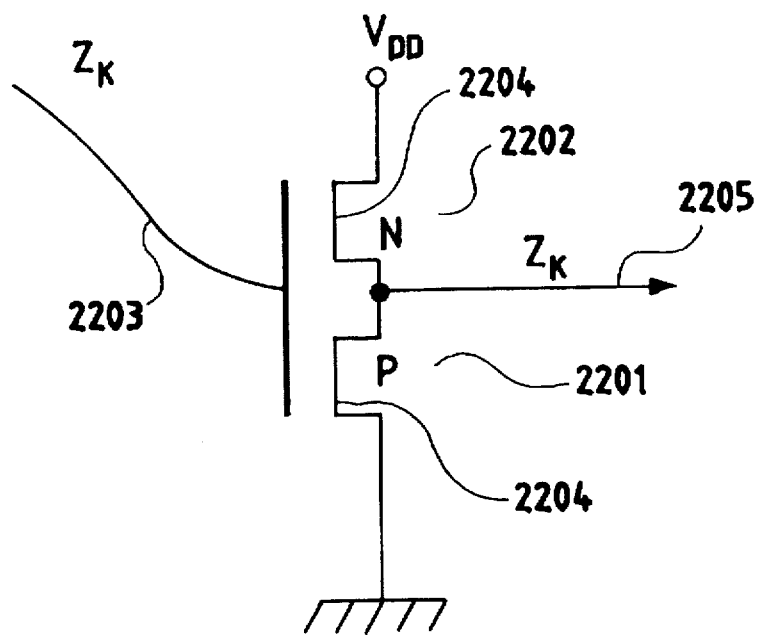
FIG. 8 relates to a second embodiment of the present invention, and shows an example of a transfer amp which is used.
Figure 9:
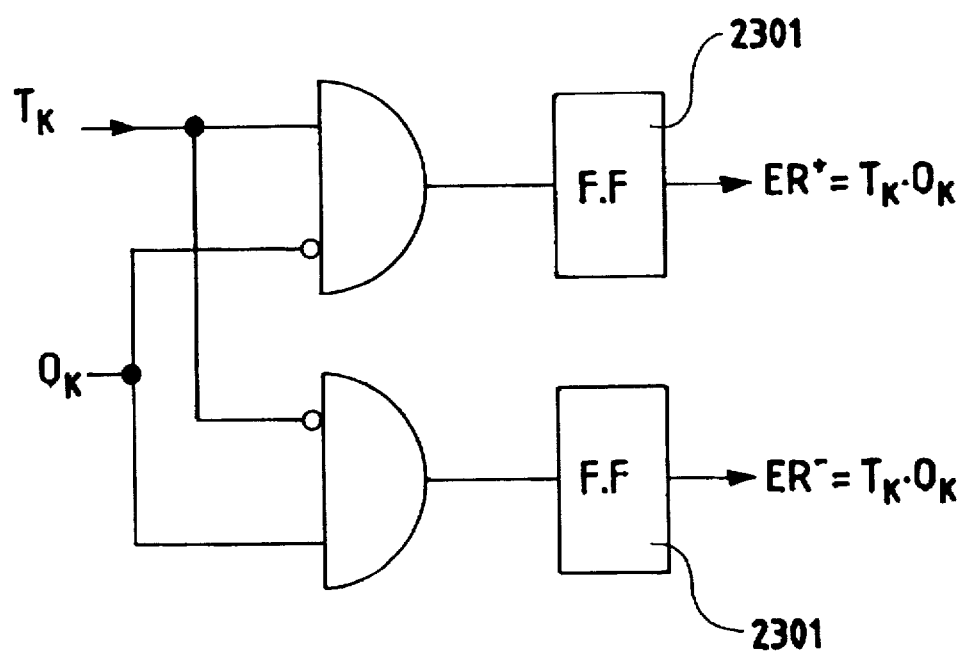
FIG. 9 relates to a second embodiment of the present invention, and shows an example of the logical gate.

A further important point is that the gate input capacity which is formed between the floating gate 2203 and the substrate of the NMOS and PMOS is so small that it may be essentially ignored. The reason for this is that the potential of the inversion layer 2204 which is formed on the surface of the substrate is $Z_K$, identical to that of the output terminal 2205, and is equivalent to the potential of the gate 2203, so that in effect, the capacity becomes essentially 0. The effect of using the vMOS source follower circuit which is shown in FIG. 8 as the transfer amp is extremely large.

Next, the error detection circuit 203 of FIG. 7 will be explained. This circuit determines the difference $T_K–O_K$ between the output $O_K$ of the neuron and the teaching signal $T_K$ (the signal which indicates the correct response); when these are in agreement, then $ER^+=ER^-=0$ is outputted, and when $T_K=1$, then if $O_K$ is 0, $ER^+=1$ and $ER^-=0$, and furthermore, when $T_K=0$, when $O_K$ is 1, $ER^+=0$ and $ER^-=1$ is outputted. This can be realized in a simple manner by a logical gate such as that shown, for example, in FIG. 9. In this circuit, a flip-flop 2301 is installed, and until the following data are set, the values of $ER^+$ and $ER^-$ can be maintained.

Figure 10:
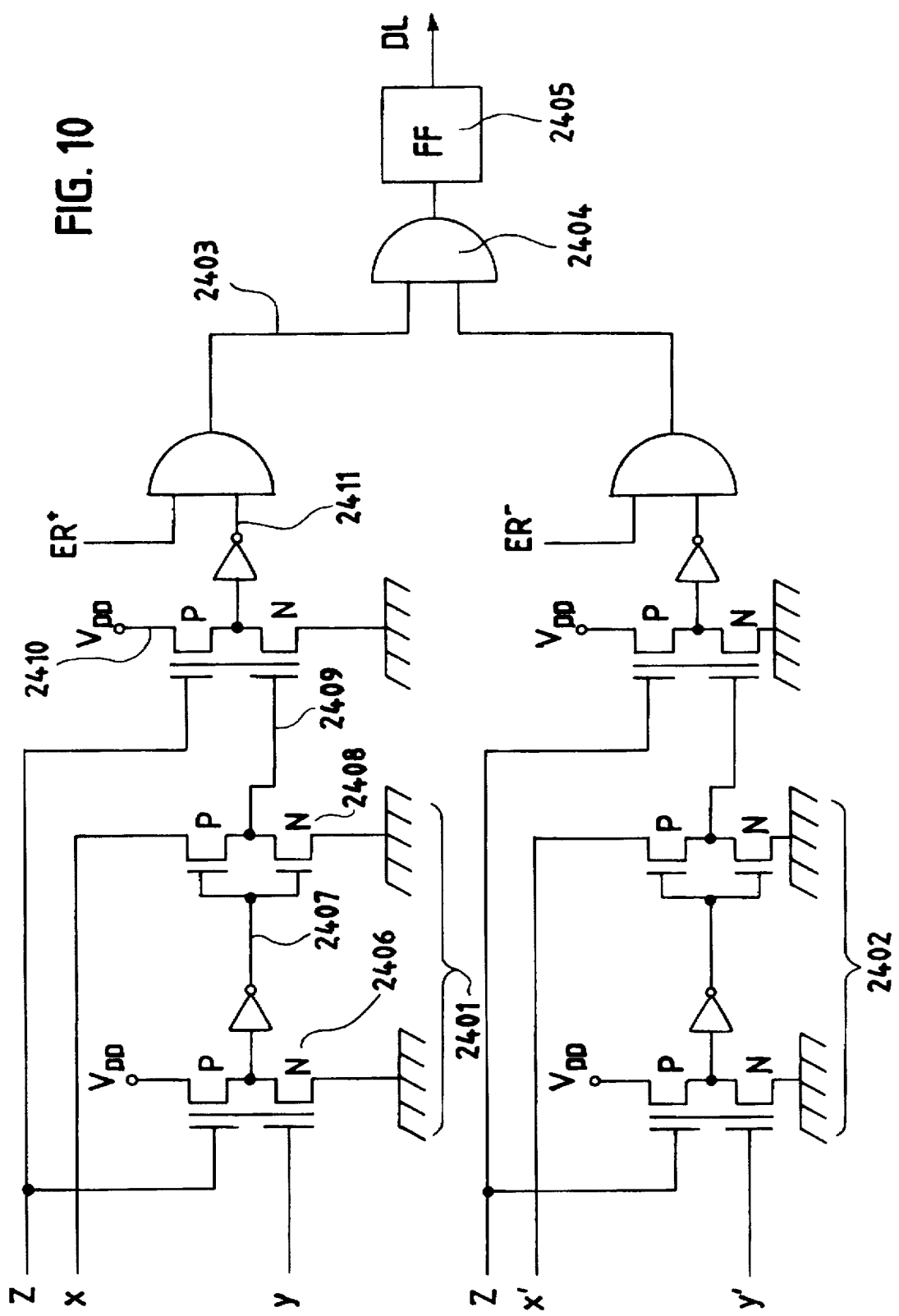
FIG. 10 relates to a second embodiment of the present invention, and shows an example of a delta generating circuit.

Next, reference 202 in FIG. 7 indicates the delta generating circuit; x, y, x', and y' are signal voltages which determine the value of ε and α. An example of this delta generating circuit is shown in FIG. 10.

This circuit comprises circuitry employing vMOS; circuit 2401 generates δ when $ER^+=1$ (the case of T=1 in FIG. 2(C)), and when $V_{TH}-\epsilon<Z<V_{TH}+\alpha$, output 2403 becomes "1" ($V_{DD}$).

Circuit 2402 outputs an output when $ER^-=1$, and when $V_{TH}-\alpha<Z<V_{TH}+\epsilon$, the output 2404 thereof becomes "1". However, in contrast to the case of FIG. 2(C), a negative signal is not outputted. Negativity is transmitted to the following stage program pulse generating circuit 204 as $ER^-=1$.

The AND value of these outputs is determined in 2404, and this is latched in flip-flop 2405 as a delta value with respect to the various neurons. Reference DL represents this output; it is inputted into the following stage pulse generating circuit 204.

Next, the operation of the circuit 2401 will be explained briefly.

Figure 11:
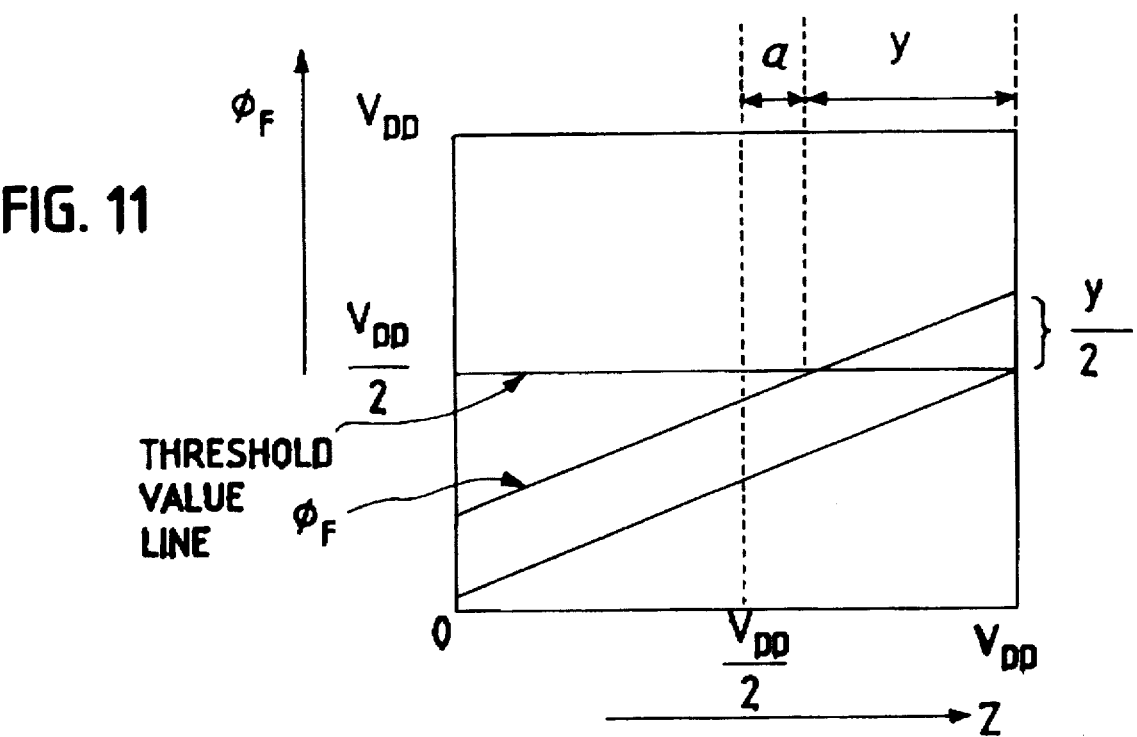
FIG. 11 relates to a second embodiment of the present invention, and shows a floating gate potential diagram (FPD) with a vMOS inverter.

Reference 2406 indicates a vMOS inverter; a floating gate potential diagram (FPD) thereof is shown in FIG. 11. This shows the potential of floating gate 2407 as a function of Z; the threshold value line is the inversion voltage of the inverter.

The capacitive coupling coefficients of the two input gates are set so as to be equivalent. The detailed explanation of this Figure is as given in Japanese Patent Application No. 3-83152. When $Z>V_{DD}-y$, this inverter enters an ON state, the floating gate 2407 has a value of 1, and the inverter 2408 also enters an ON state. As a result, the output 2409 thereof falls from input signal x to 0.

Figure 12:
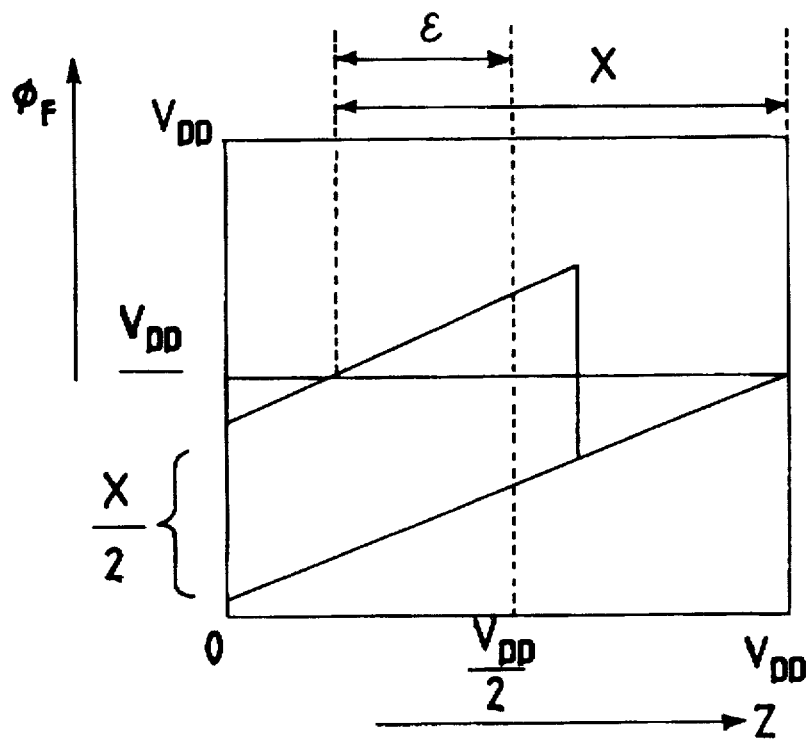
FIG. 12 relates to second embodiment of the present invention, and shows the FDP of a vMOS inverter.

Next, a FDP of the vMOS inverter 2410 is shown in FIG. 12.

As is clear from the Figure, the potential of the floating gate exceeds the threshold value line when:

$$V_{DD}/2-\epsilon<Z<V_{DD}/2+\alpha$$

and this time the potential of a line 2411 is "1". As is clear from the Figure, the following result:

$$\alpha+y=V_{DD}/2$$

$$V_{DD}/2+\epsilon=x$$

so that $\alpha$ and $\epsilon$ are determined from y and x by the following formula.

$$\alpha=V_{DD}/2-y$$

$$\epsilon=x-V_{DD}/2$$

That is to say, $\alpha$ and $\epsilon$ can be set to freely selected values. In circuit 2402, $\alpha$ and $\epsilon$ can be set to freely selected values by means of the values of y' and x', as follows:

$$\epsilon=V_{DD}/2-y'$$

$$\alpha=x'-V_{DD}/2$$

There are two cases in which one or the other of $ER^+$ and $ER^-$ has a value of one; however, in both of these cases, setting may be conducted so that $\alpha$ and $\epsilon$ become the same, or x, y, x', and y' may be set so they have differing values.

As explained above, it is clear that the circuit of FIG. 10 correctly generates the DL signal.

Figure 13:
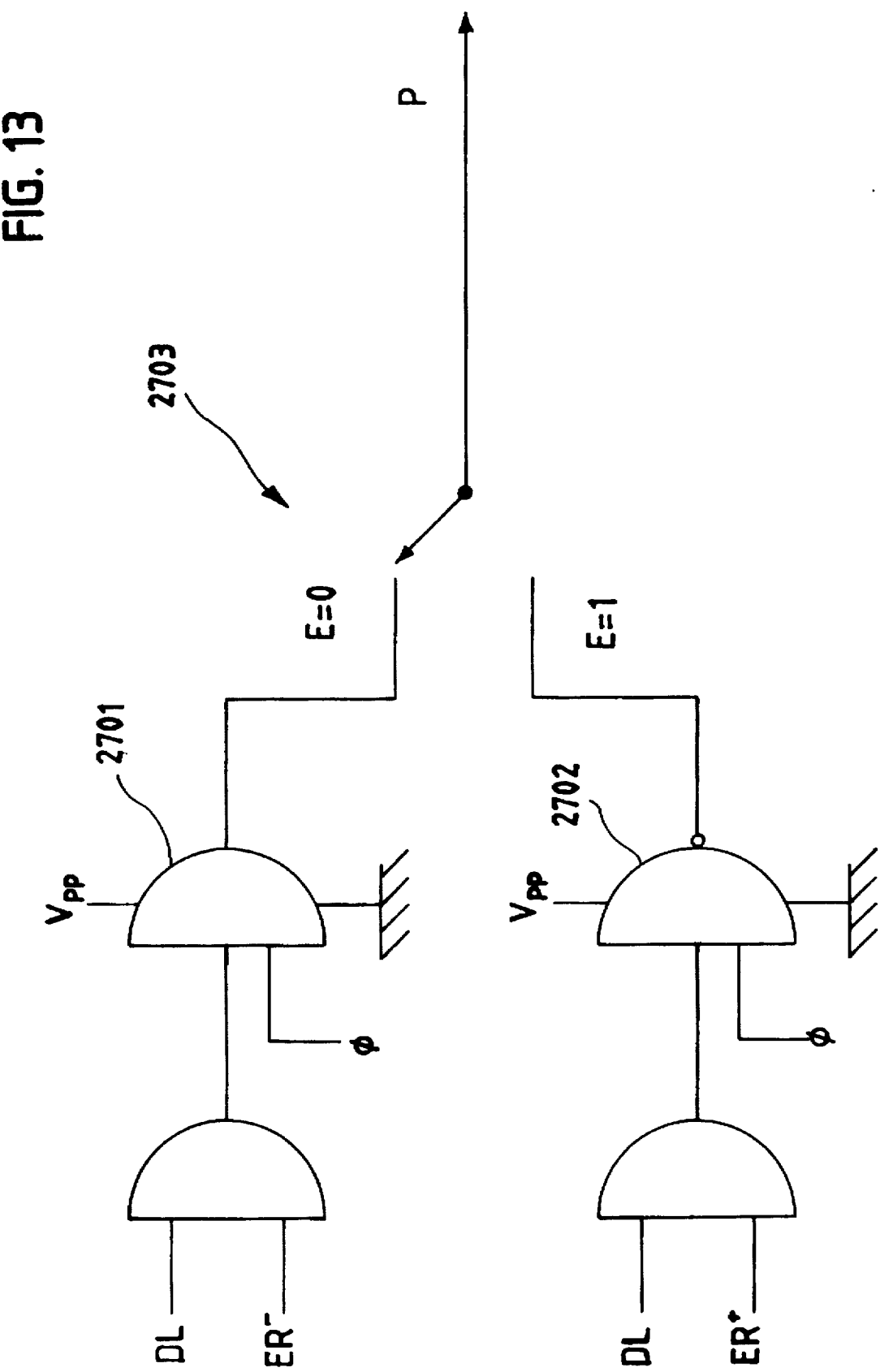
FIG. 13 relates to a second embodiment of the present invention, and shows an example of a circuit diagram of a program pulse generating circuit.

Next is the program pulse generating circuit 204 of FIG. 7; an example of a circuit diagram thereof is shown in FIG. 13.

As shown in the Figure, reference $V_{PP}$ represents the program voltage, and $V_{PP}>V_{DD}$; NAND circuits 2701 and 2702 both output a LOW of 0V, and a HIGH of $V_{PP}$. Furthermore, if the education control signal E has a value of 0, then switch 2703 is connected to the upper circuit, and together with the start-up of pulse $\phi$, a program pulse of height $V_{PP}$ is outputted to P. When the education control signal has a value of 1, the switch is connected to the lower side, and together with the start-up of $\phi$, a pulse is outputted which falls from $V_{PP}$ to 0.

This signal P is connected, for example, to $V_X$ in FIG. 22, and by means of setting $V_E=0$, electrons are implanted in the floating gate; that is to say, the weighting is reduced.

When E=1, electrons are removed from the floating gate in order to Set $V_E=V_{PP}$, and the weighting is increased. That is to say, in correspondence with $ER^+=1$ or $ER^-=1$, the weighting is increased or reduced.

As discussed above, in accordance with the present invention, it is possible to realize on-chip neural network learning by means of extremely simple circuitry. The method possesses important characteristics in that a high performance computer is completely unnecessary, and it is possible to construct the entire network using a simple sequence of circuits.

(Embodiment 3)

Next, the composition of a neural network comprising a third embodiment of the present invention will be explained using FIG. 13.

References 3101a–3101c are output layer neurons, and references 3102a–3102c are floating gates corresponding to these neurons. A learning control circuit is installed in each neuron, as shown in FIG. 1; however, these are omitted here for the purpose of simplicity. References 3103a–3103c are synapse circuits; the circuits shown in, for example, FIG. 22, may be employed therefor.

In the synapse of FIG. 22, a junction is made with the floating gate via two capacitors; however, for the purposes of simplicity, only one capacitor is depicted.

Reference 3104 indicates a floating gate for back propagation; this is connected with the synapse 3103a via capacitor 3105, but this connection is controlled by switch 3106. Here, as well, for the purposes of simplicity, only one capacitor is depicted; however, as in the case of the junction with the floating gate 3102 of the neuron, connection may be conducted via two capacitors.

Figure 15:
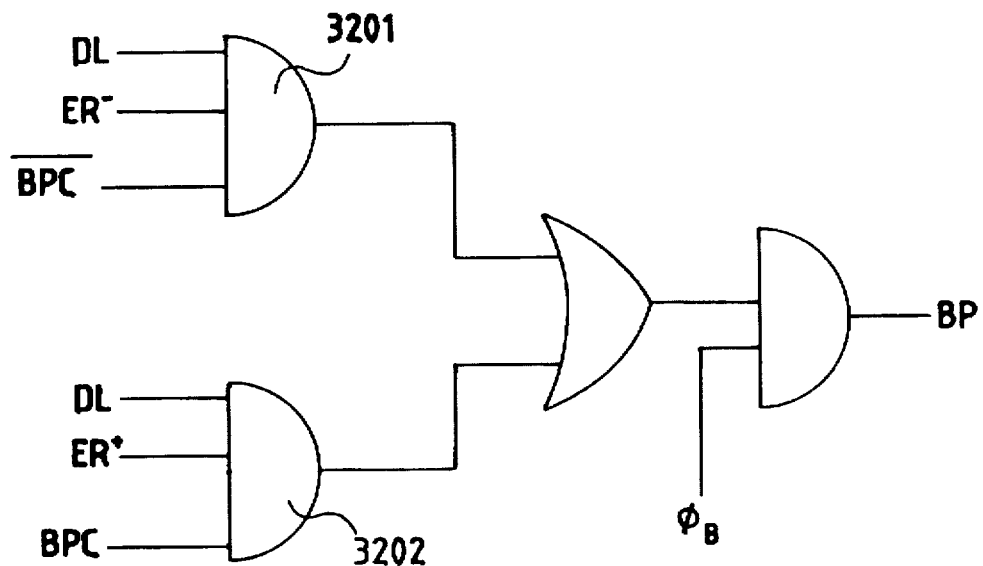
FIG. 15 relates to a third embodiment of the present invention, and shows an example of a BP circuit composition.

The on and off state of switch 3106 is conducted by the output signals BP of back propagation control circuits 3107a–3107c. An example of the BP circuit structure is shown in FIG. 15.

Reference BPC indicates the back propagation control signal, and when BPC=0, NAND circuit 3201 outputs DL/ER$^-$. That is to say, only a delta having a negative sign is outputted. In accordance with DL=0,1, the output value is a binary signal of 0,1. The fact that this carries a negative sign allows the circuit to recognize it, since it is a signal that is outputted when BPC=0.

Figure 14:
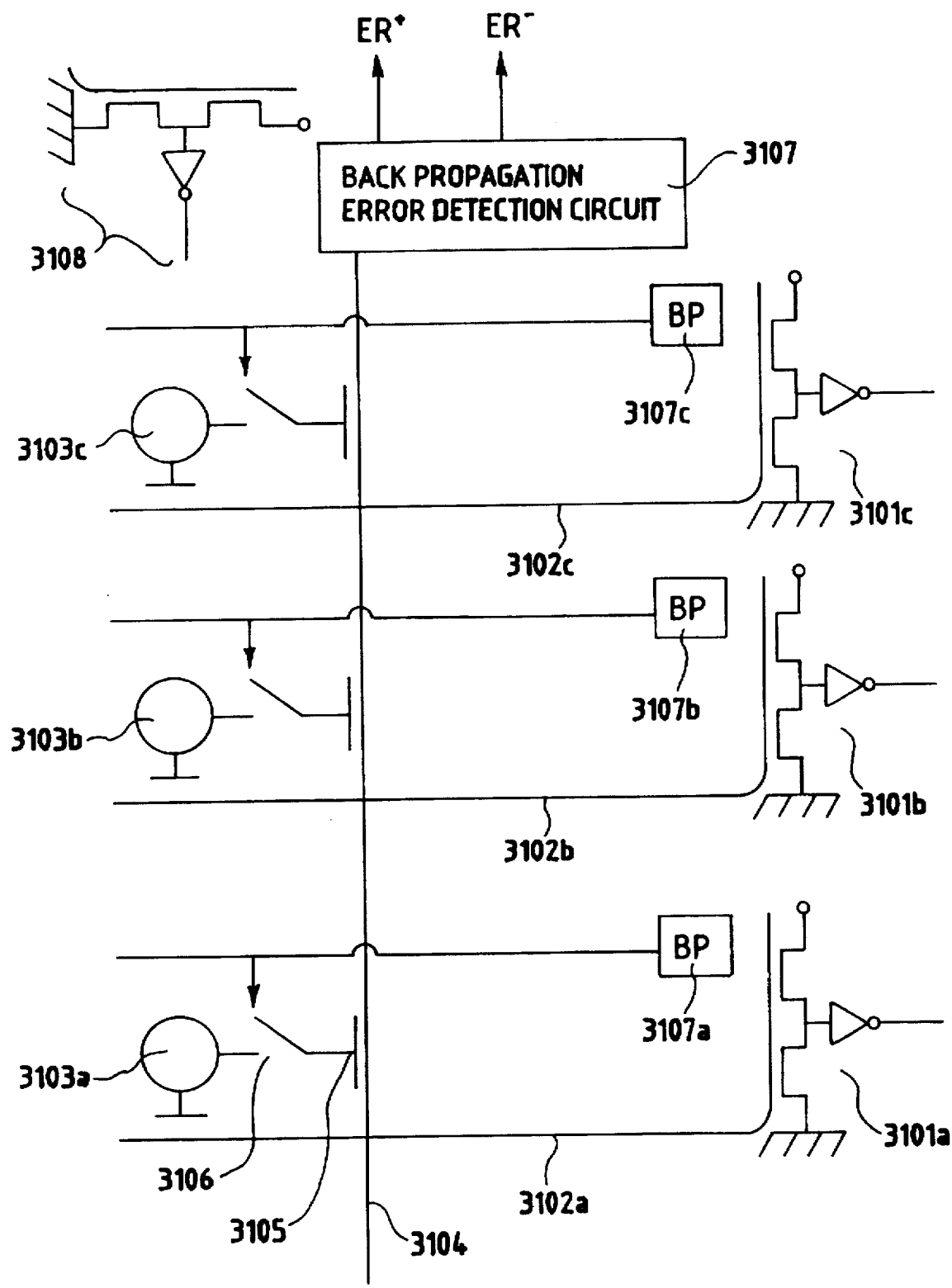
FIG. 14 is a block diagram of a neural network showing a third embodiment of the present invention.
Figure 16:
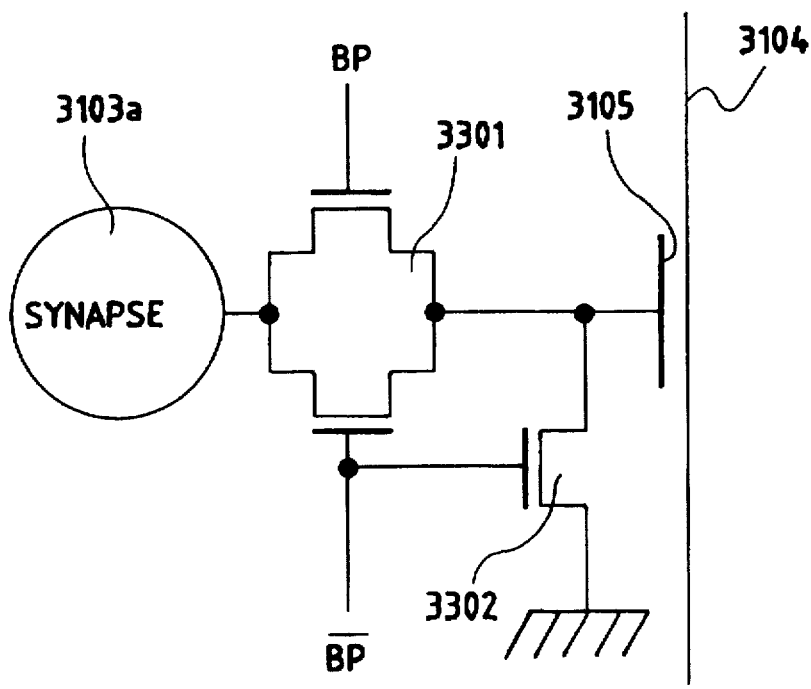
FIG. 16 relates to a third embodiment of the present invention, and shows in detail the connecting portion of the floating gate.

A DL carrying a positive sign is outputted from NAND gate 3202 when BPC=1, and the various values are outputted as BP only when the control clock $\phi_B$ has a value of 1. When BP=1, switch 3105 is coupled to the output of the synapse, while when BP=0, the input terminal of capacitor 3105 is grounded. FIG. 14 depicts the outlines in simplified form for the purposes of explanation; the details of the operation are not shown. Accordingly, if the connecting portion of synapse 3103a and floating gate 3104 is shown in greater detail, for example, as shown in FIG. 16, the ON/OFF state of CMOS switch 3301 is controlled by the BP and BP (bar) ("(bar)" indicates the inversion signal) signals, and by means of NMOS 3302, when BP=0, the input of capacitor 3105 is grounded.

Floating gate 3104 serves as the input of back propagation error detection circuit 3107, and here, the average of the errors of the output layer neurons 3101a–3101c is calculated, and the error signals $ER^+$ and $ER^-$ for the learning of the hidden layer neuron 3108 are determined.

Figure 17:
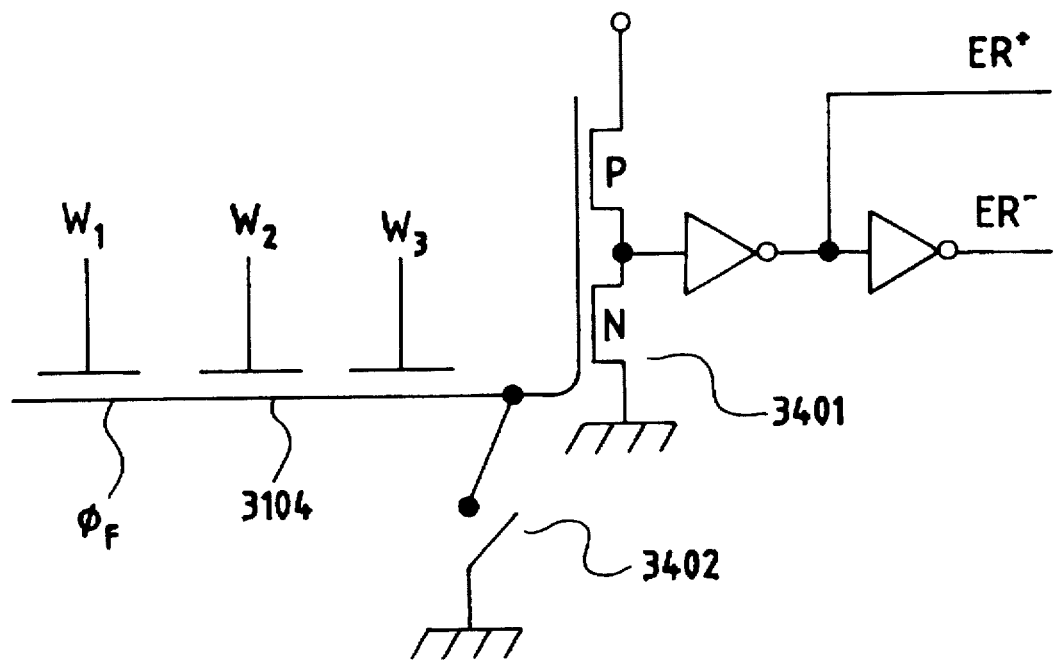
FIG. 17 relates to a third embodiment of the present invention, and shows an example of a back propagation error detection circuit.

Next, an example of the circuit 3107 is shown in FIG. 17.

In the Figure, reference 3401 indicates a vMOS inverter, and reference 3104 indicates the floating gate thereof; parts having references identical to those in FIG. 14 correspond to one another.

References $W_1$, $W_2$, and $W_3$ indicate the weighted outputs of synapse circuits 3103a, 3103b, and 3103c; when BP=1, these have a value of 0. Reference 3402 indicates a switch attached to the floating gate.

Next, the operation of this circuitry will be explained.

First, if BPC=0 is set in the circuitry of FIG. 15, the values of DL accompanying the output layer neurons 3101a–3101c, in which $ER^-=1$, appear in the output of NAND circuit 3201, and appear in BP together with the start-up of $\phi_B$, that is to say, only the switches of the synapses corresponding to neurons possessing a negative delta are placed in an ON state. If neuron 3101c is assumed to have a negative delta, then the switch 3103c is placed in an ON state. That is to say, when $W_3$ does not equal 0, $W_1=W_2=0$.

Now, if the potential of the floating gate 3104 is represented by $\phi_F$, then this is generally expressed by:

$$\phi_F = \{C(W_1+W_2+W_3)+Q_F\}/C_{TOT} \quad \text{Form. A1}$$

If $W_1=W_2=0$ is set, then this can be expressed by:

$$\phi_F = (CW_3+Q_F)/C_{TOT} \quad \text{Form. A2}$$

Here, switch 3402 is closed, and $\phi_F$ becomes equal to 0. When this is done, a negative charge of, from Formula A2, $$Q_F = -CW_3 \quad \text{Form. A3}$$

flows into the floating gate. Then, when switch 3402 is again placed in an OFF state, the charge expressed by Formula A3 is stored within the floating gate.

Next, if BPC is set equal to 1, only the BP corresponding to neurons in which $ER^+=1$, that is to say, having a positive delta, assume a value of 1 together with the start-up of $\phi_B$.

Here, as an example, it will be assumed that the neurons 3101a and 3101b correspond thereto. If this is done, the potential of floating gate 3104 will be, in accordance with formula A1, $$\Phi_F = \{C(W_1+W_2)+Q_F\}/C_{TOT}$$
$$= \{C(W_1+W_2)-CW_3\}/C_{TOT}$$
$$= C(W_1+W_2-W_3)/C_{TOT}$$

and a result averaging the values of delta corresponding to W, including the sign, is obtained.

Figure 18:
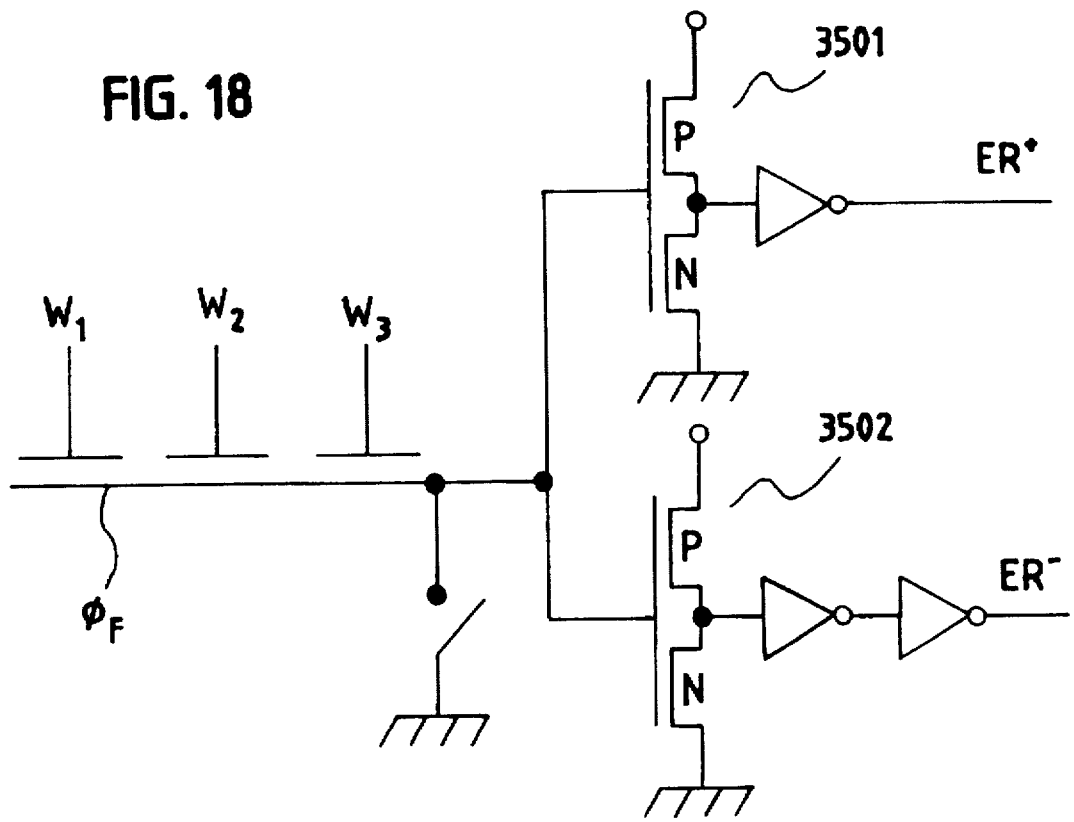
FIG. 18 relates to a third embodiment of the present invention, and is a block diagram of the case in which $ER^+=ER^-=0$.
Figure 19A:
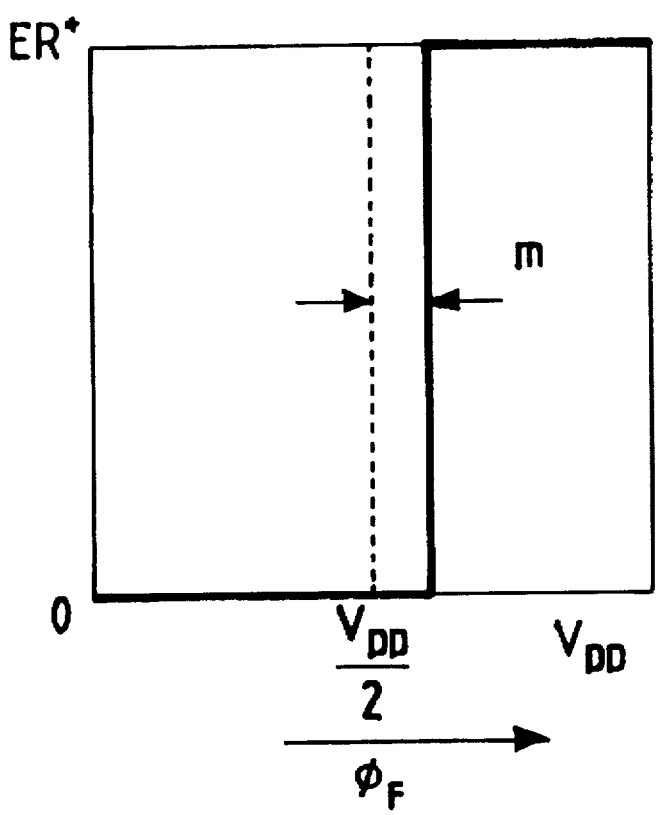
FIG. 19 relates to a third embodiment of the present invention, and shows the signals of $ER^+$, $ER^-$ in the case shown in FIG. 18.
Figure 19B:
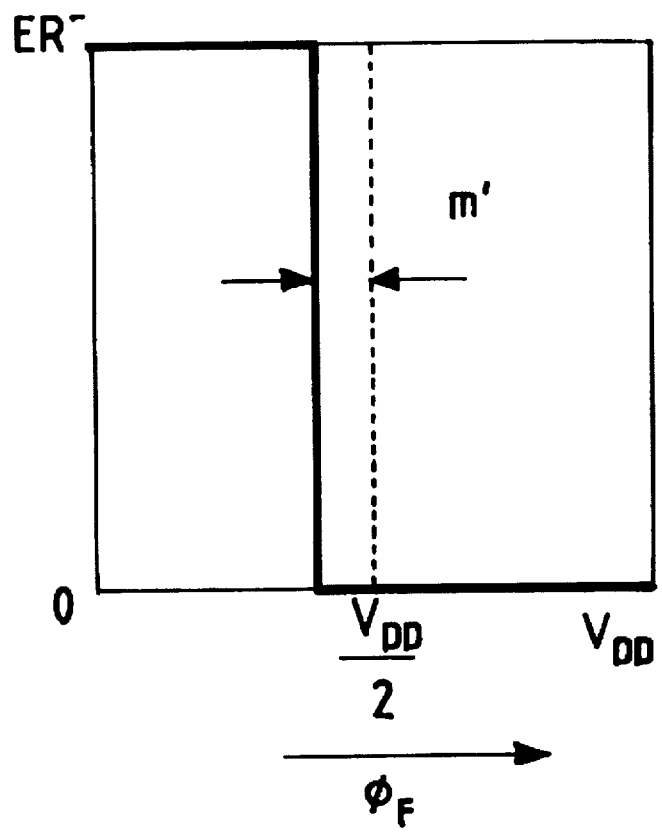

If the potential of the floating gate is set so that, for example, the inversion voltage thereof is $V_{DD}/2$, then the following results:

when $\Phi_F > (V_{DD}/2)$, $ER^+=1$, $ER^-=0$ when $\Phi_F < (V_{DD}/2)$, $ER^+=0$, $ER^-=1$ and these correspond to an effective error of $^+1$ or $^-1$. In this case, $ER^+=ER^-=0$ does not result. If the case in which $ER^+=ER^-=0$ is to be realized, then, as shown for example in FIG. 18, two vMOS inverters 3501 and 3502 possessing respective inversion voltages of $(V_{DD}/2)+m$ and $(V_{DD}/2)-m'$ may be used. By proceeding in this manner, $ER^+$ and $ER^-$ signals such as those shown in FIG. 19 can be obtained.

m and m' are respectively provided at dedicated input gates, so that they may be made variable. These $ER^+$ and $ER^-$ signals are used as the $ER^+$ and $ER^-$ signals of the circuitry of FIG. 7. By proceeding in this manner, it is possible to conduct the learning control of the neuron 3108 of the hidden layer in a manner identical to that of the output layer.

In accordance with the present embodiment, complicated calculations, such as error back propagation and the like, can be realized by means of extremely simple circuitry.

In the third embodiment in accordance with the present invention described above, a determination was made as to whether to transmit synapse weighting values to floating gate 3104 by means of circuitry such as that shown in FIG. 16; however, this may also be conducted by means of the control of $V_i$ and $V_i$(bar) in the synapse circuit of FIG. 22. If the floating gate 110 in this Figure is viewed not as the input of a neuron, but as rather the input of vMOS inverter 3401, the same operations may be conducted. That is to say, if the AND of $V_i$ and the BP signal is used as $V_i$, then by means of the 0,1 of the BP signal, the $V^+$ and $V^-$ signals are transmitted to the floating gate 3104 for back propagation. By proceeding in this manner, it is possible to further simplify the circuitry, and thus a large merit is obtained.

As described above, the realization of a semiconductor LSI chip which conducts self-teaching becomes possible for the first time by means of the present invention.

As a result, it is no longer necessary to calculate the synapse weightings and alter them one by one using an external computer, and neural networks can be used in various systems, and by means of on-site leasing, it becomes possible to conduct the optimal value control of the systems.

Industrial Applicability

By means of the present invention, it becomes possible to realize a self-teaching function of a neural network by means of extremely simple circuitry.

We claim:

1. An artificial neural circuit comprising: a first plurality of synapse circuits which output values of input signals multiplied by predetermined weighting values $W_i$, and a plurality of neuron circuits which determine a total value Z representing the result of linear addition of outputted value signals of a second plurality of synapse circuits, and which output a high level signal voltage when, with respect to a predetermined threshold $V_{TH}$, $Z > V_{TH}$, and output a low level signal voltage when $Z < V_{TH}$, wherein during learning of a respective neuron circuit, with respect to learning of increasing the total value Z, only when $$V_{TH}-\epsilon < Z < V_{TH}+\alpha$$

with respect to two positive parameters $\epsilon$ and $\alpha$ is the weighting value of predetermined synapse circuits which input signals into said respective neuron circuit increased by a first predetermined positive value, and in the case of learning of decreasing the total value Z, only in the case in which $$V_{TH}-\alpha < Z < V_{TH}+\epsilon$$

is the weighting value of predetermined synapse circuits which input signals into said respective neuron circuit decreased by a second predetermined positive value.

2. An artificial neural circuit in accordance with claim 1, wherein $\epsilon > \alpha$.

3. An artificial neural circuit in accordance with claim 1, wherein said respective neuron circuit comprises neuron MOS transistors, each neuron MOS transistor having semiconducting regions of a single conductivity type on a substrate, a source region and a drain region of opposite conductivity type provided within said semiconducting regions, a floating gate electrode which is provided in a region between said source region and said drain region via a first insulating film and which has a floating gate potential, and a plurality of control gate electrodes which are capacitively coupled with said floating gate electrode via a second insulating film.

4. An artificial neural circuit in accordance with claim 3, wherein a source follower circuit employing neuron MOS develops a signal from the floating gate potentials of the neuron MOS transistors comprising said respective neuron circuit, said signal being inputted into a circuit which controls the learning of said respective neuron circuit.

5. An artificial neural circuit in accordance with claim 4, wherein at least one of said neuron MOS transistors has a second floating gate electrode disposed perpendicularly to the first-named floating gate electrode of the neuron MOS transistors comprising said respective neuron circuit, said second floating gate electrode and an output terminal of each of said synapse circuits being coupled via capacitance.

6. An artificial neural circuit in accordance with claim 5, wherein a switch for connecting said second floating gate electrode to an electrode possessing a predetermined potential is provided between said second floating gate electrode and said electrode.

* * * * *